(12) United States Patent
Vardi et al.

(10) Patent No.: US 11,704,450 B2
(45) Date of Patent: Jul. 18, 2023

(54) SYSTEMS AND METHODS FOR GENERATING DATA-DRIVEN OPTIMIZED ARCHITECTURAL DESIGN

(71) Applicant: Silverstein Properties, Inc., New York, NY (US)

(72) Inventors: Guy Vardi, New York, NY (US); Danil Nagy, New York, NY (US); Daniel Goldstern, Brooklyn, NY (US)

(73) Assignee: SILVERSTEIN PROPERTIES, INC., New York, NY (US)

( * ) Notice: Subject to any disclaimer, the term of this patent is extended or adjusted under 35 U.S.C. 154(b) by 355 days.

(21) Appl. No.: 16/670,818

(22) Filed: Oct. 31, 2019

(65) Prior Publication Data

US 2020/0134243 A1 Apr. 30, 2020

Related U.S. Application Data

(60) Provisional application No. 62/753,477, filed on Oct. 31, 2018.

(51) Int. Cl.
*G06G 7/48* (2006.01)
*G06F 30/13* (2020.01)
(Continued)

(52) U.S. Cl.
CPC .............. *G06F 30/13* (2020.01); *G06F 30/27* (2020.01); *G06Q 10/10* (2013.01); *G06F 2111/02* (2020.01)

(58) Field of Classification Search
CPC ...... G06F 30/13; G06F 30/27; G06F 2111/02; G06Q 10/10
See application file for complete search history.

(56) References Cited

U.S. PATENT DOCUMENTS 11,157,662 B2 * 10/2021 Benjamin ........ G06Q 10/06313
2004/0113937 A1 6/2004 Sawdey et al.
(Continued)

OTHER PUBLICATIONS

Caldas, Luisa Gama, and Leslie K. Norford. "A design optimization tool based on a genetic algorithm." Automation in construction 11.2 (2002): 173-184.*
(Continued)

*Primary Examiner* — Rehana Perveen
*Assistant Examiner* — Nithya J. Moll
(74) *Attorney, Agent, or Firm* — Wilmer Cutler Pickering Hale and Dorr LLP

(57) ABSTRACT

Disclosed systems and methods relate to generating and optimizing an architectural design. According to embodiments, a method can include receiving metadata of digital communications and collaboration between members of an organization. The method can also include generating a target network model indicating a work style of the members of the organization; a level of interaction between the members of the organization; a spatial clustering of the members; or a number, a size, and an allocation of rooms with a specialized purpose. The method can further include selecting at least one criterion for the architectural design, where the criterion can include: cost, wellness, community, work style, choice, privacy, or vibrancy. The method can further include determining criteria scores for one or more architectural design prototypes. Moreover, the method can include selecting the architectural design based on the criterion scores.

24 Claims, 16 Drawing Sheets

(51) Int. Cl.
    *G06Q 10/10*   (2023.01)
    *G06F 30/27*   (2020.01)
    *G06F 111/02*  (2020.01)

(56) References Cited

U.S. PATENT DOCUMENTS

| | | |
|---|---|---|
| 2005/0114095 A1 | 5/2005 | Guld |
| 2008/0055554 A1 | 3/2008 | Tubin et al. |
| 2008/0183483 A1 | 7/2008 | Hart |
| 2010/0106554 A1 | 4/2010 | Dahiwadkar |
| 2016/0012359 A1* | 1/2016 | Wood ................. G06Q 10/0631 705/7.12 |
| 2016/0048612 A1* | 2/2016 | Simon .................... G06F 30/13 703/1 |
| 2018/0137214 A1* | 5/2018 | Benjamin ............. G06T 19/003 |

OTHER PUBLICATIONS

Sykes, Edward R. "Interruptions in the workplace: A case study to reduce their effects." International Journal of Information Management 31.4 (2011): 385-394.*

Michalek, Jeremy, and Panos Papalambros. "Interactive design optimization of architectural layouts." Engineering optimization 34.5 (2002): 485-501.*

V.D. Blondel et al., "Fast unfolding of communities in large networks," Journal of Statistical Mechanics: Theory and Experiment, Oct. 9, 2008 (12 pages).

International Search Report and Written Opinion received in PCT/US19/059221 dated Jan. 24, 2020 (11 pages).

* cited by examiner

SYSTEMS AND METHODS FOR GENERATING DATA-DRIVEN OPTIMIZED ARCHITECTURAL DESIGN

RELATED APPLICATION

This application claims the benefit under 35 U.S.C. § 119(e) to U.S. Provisional Application No. 62/753,477, entitled "Systems and Methods for Generating Data-Driven Optimized Architectural Design," which was filed on Oct. 31, 2018, the entire contents of which are incorporated herein by reference.

FIELD OF THE DISCLOSURE

The present disclosure relates to computer-implemented systems and methods for analyzing information from digital communications networks or channels within an organization and automatically generating data-driven optimized architectural designs based on various criteria selected by an organization.

BACKGROUND

Architectural designs utilize floorplans where one level of a building structure is typically drawn in scale, illustrating the layouts of the floor in a view from above. For example, an office floorplan can show the layouts of a physical workspace's walls, windows, doors, elevators, stairs, furniture, and appliances. An office floorplan that efficiently utilizes a workspace and allocates rooms and offices to organization members in accordance with the residing organization's needs is desirable.

Typically, assignments of members or departments to different rooms and workspaces is done based on criteria, such as seniority, e.g., a high-ranked member of the organization may be assigned to a corner office, which may not be optimized for or may not promote the organization's goals and culture, for example, promoting collaboration between the members of the organization or their wellness. An optimized architectural design can help promote an office environment conducive for an effective organizational culture. But it can be a challenge to design a highly optimized office floorplan, e.g., a floorplan that satisfies different criteria or goals set by an organization. For example, it can be difficult to conduct an extensive analysis of an organization's culture, as expressed, for example, by the typical communication and collaboration patterns exhibited by the organization's members. Therefore, there is a need for systems and methods that can automatically collect information about an organization and can automatically generate data-driven optimized architectural designs based on the organization's culture and/or goals.

SUMMARY

Systems and methods for generating an architectural design are provided. According to embodiments, a method for generating an architectural design can include receiving, from a digital communications and collaboration network of an organization, metadata of digital communications and collaboration between members of the organization, where the received metadata can be in a predetermined digital format. The method can also include generating a target network model for the architectural design based on the received metadata of digital communications and collaboration between the members of the organization, the target network model indicating a work style of the members of the organization generated by partitioning the members of the organization into different clusters based on the metadata, a level of interaction between the members of the organization generated based on a frequency of the digital communications and collaboration between the members as indicated by the metadata, one or more members of the organization with a predetermined pattern of communications with other members of the organization based on the metadata, or a spatial clustering of the members of the organization based on the level of interaction between the members of the organization. The method can also include selecting at least one criterion for the architectural design, the at least one criterion including a cost criterion, a wellness criterion, a community criterion, a work style criterion, a choice criterion, a privacy criterion, or a vibrancy criterion. The method can also include determining criteria scores for one or more architectural design prototypes by correlating the one or more architectural design prototypes to the target network model based on the at least one criterion. The method can also include automatically selecting one or more architectural designs from the one or more architectural design prototypes based on the criteria scores for the one or more architectural design prototypes. The method can also include displaying, on a display device, the target network model, the at least one criterion for the architectural design, the one or more architectural designs, or criteria scores for the one or more architectural designs.

According to embodiments, the method can further include monitoring the digital communications and collaboration network of the organization. The method can also include collecting the metadata of the digital communications and collaboration between the members of the organization, where the metadata can be collected in the predetermined digital format by extracting, transforming, and loading the metadata of the digital communications and collaboration between the members of the organization, the collected metadata of digital communications and collaboration between the members of the organization comprising metadata of at least one of emails, calendars, file sharing, workflow, code commits or instant messages. The method can also include sending the collected metadata of the digital communications and collaboration between the members of the organization.

According to embodiments, the one or more members of the organization with the predetermined pattern of communications with the other members of the organization based on the metadata can include a member of the organization who communicates or collaborates with at least a first threshold number of the members of the organization, or a member of one department of the organization who communicates or collaborates with at least a second threshold number of members in another department of the organization.

According to embodiments, the method can further include receiving a floor plan. The method can also include generating grid lines to divide the floorplan into cells. The method can also include determining a layout for at least one of the cells. The method can also include assigning the intended use of the layout, thereby generating the one or more architectural design prototypes.

According to embodiments, the method can further include receiving a floorplan including one or more layouts. The method can also include assigning a use of the one or more layouts, thereby generating the one or more architectural design prototypes.

According to embodiments, the target network model can further indicate the spatial clustering of the members of the organization into zones based on the level of interactions between the members of the organization; or a number, a size, and an allocation of rooms with a specialized purpose for at least one of the zones.

According to embodiments, the rooms with the specialized purpose can include a conference room, a meeting room, a board room, or a phone booth.

According to embodiments, the method can further include displaying, on a display device, the target network model, the at least one criterion for the architectural design, the one or more architectural design prototypes, the criteria scores for the one or more architectural design prototypes, the one or more architectural designs, or criteria scores for the one or more architectural designs.

According to embodiments, the method can further include selecting, by a user, the at least one criterion. The method can also include displaying, to the user, the one or more architectural designs and criteria scores for the one or more architectural designs. The method can also include selecting, by the user, the architectural design from the one or more architectural designs.

According to embodiments, the criteria scores for the one or more architectural design prototypes can be determined by performing a simulation, a heuristic model calculation, or an agent-based simulation.

According to embodiments, the one or more architectural designs can be selected based on one or more of the criteria scores for the one or more architectural design prototypes with a highest score value, or a sum of the criteria scores for the one or more architectural design prototypes.

According to embodiments, a system for generating an architectural design can include a display device, a memory, or a processor coupled to the memory programmed with executable instructions. The system can also include the memory programmed with the instructions that can include a modeling engine for obtaining a target network model for the architectural design. The system can also include the modeling engine configured to receive, from a digital communications and collaboration network of an organization, metadata of digital communications and collaboration between members of the organization, where the received metadata can be in a predetermined digital format. The system can also include the modeling engine configured to generate the target network model for the architectural design based on the metadata the target network model indicating a work style of the members of the organization generated by partitioning the members of the organization into different clusters based on the metadata, a level of interaction between the members of the organization generated based on a frequency of the digital communications and collaboration between the members as indicated by the metadata, one or more members of the organization with a predetermined pattern of communications with other members of the organization based on the metadata, or a spatial clustering of the members of the organization based on the level of interaction between the members of the organization. The system can also include the memory programmed with the instructions that can further include a design analyzer for obtaining one or more architecture designs. The system can also include the design analyzer configured to select at least one criterion for the architectural design, the at least one criterion including a cost criterion, a wellness criterion, a community criterion, a work style criterion, a choice criterion, a privacy criterion, or a vibrancy criterion. The system can also include the design analyzer configured to determine criteria scores for one or more architectural design prototypes by correlating the one or more architectural design prototypes to the target network model based on the at least one criterion. The system can also include the design analyzer configured to automatically select the one or more architectural designs from the one or more architectural design prototypes based on the criteria scores for the one or more architectural design prototypes. The system can also include the memory programmed with the instructions that can further include a user interface, where the user interface is configured to display, on the display device, the target network model, the at least one criterion for the architectural design, the one or more architectural designs, or criteria scores for the one or more architectural designs.

According to embodiments, the system can also include a digital communications monitor configured to monitor the digital communications and collaboration network of the organization. The system can also include the digital communications monitor configured to collect the metadata of the digital communications and collaboration between the members of the organization, where the metadata can be collected in the predetermined digital format by extracting, transforming, and loading the metadata of the digital communications and collaboration between the members of the organization, and the collected metadata of digital communications and collaboration between the members of the organization can be metadata of emails, calendars, file sharing, or instant messages.

According to embodiments, the one or more members of the organization with the predetermined pattern of communications with the other members of the organization based on the metadata can include a member of the organization who communicates or collaborates with at least a first threshold number of the members of the organization, or a member of one department of the organization who communicates or collaborates with at least a second threshold number of members in another department of the organization.

According to embodiments, the system can also include the memory programmed with the instructions that can further include a design generator configured to receive a floorplan as an input. The design generator can also be configured to generate grid lines to divide the empty floorplan into cells. The design generator can also be configured to determine a layout for at least one of the cells. The design generator can also be configured to assign the intended use of the layout, thereby generating the one or more architectural design prototypes.

According to embodiments, the system can also include the memory programmed with the instructions that can further include a design generator configured to receive, via the user interface, an input of a floorplan including one or more layouts. The design generator can also be configured to assign a use of the one or more layouts, thereby generating the one or more architectural design prototypes.

According to embodiments, the generated target network model can further indicate the spatial clustering of the members of the organization into zones based on the level of interaction between the members of the organization; or a number, a size, and an allocation of rooms with a specialized purpose for at least one of the zones based on the metadata of the digital communications and collaboration indicating a number of meetings, a number of attendants for the meetings, and a duration of the meetings.

According to embodiments, the rooms with the specialized purpose can include a conference room, a meeting room, a board room, or a phone booth.

According to embodiments, the system can further include a display device configured to display the target network model, the at least one criterion for the architectural design; the one or more architectural design prototypes, the criteria scores for the one or more architectural design prototypes, the one or more architectural designs, or criteria scores for the one or more architectural designs.

According to embodiments, the user interface can be further configured to receive a selection by a user of the at least one criterion for the architectural design. The user interface can also be configured to display the one or more architectural designs and criteria scores for the one or more architectural designs on the display device. The user interface can also be configured to receive a selection by the user of the architectural design from the one or more architectural designs.

According to embodiments, the design analyzer can be configured to determine the criteria scores for the one or more architectural design prototypes by performing a simulation, a heuristic model calculation, or an agent-based simulation.

According to embodiments, the design analyzer can be configured to automatically select the one or more architectural designs from the one or more architectural design prototypes based on one or more of the criteria scores for the one or more architectural design prototypes with a highest score value, or a sum of the criteria scores for the one or more architectural design prototypes.

BRIEF DESCRIPTION OF THE DRAWINGS

The following figures are provided for the purpose of illustration only and are not intended to be limiting.

DETAILED DESCRIPTION

The following describes embodiments of the present disclosure. The designs, figures, and description are non-limiting examples of embodiments of the present disclosure. Other embodiments may or may not include the features disclosed herein. Moreover, disclosed advantages and benefits may apply to only one or some embodiments and should not be used to limit the scope of the present disclosure.

Figure 1:
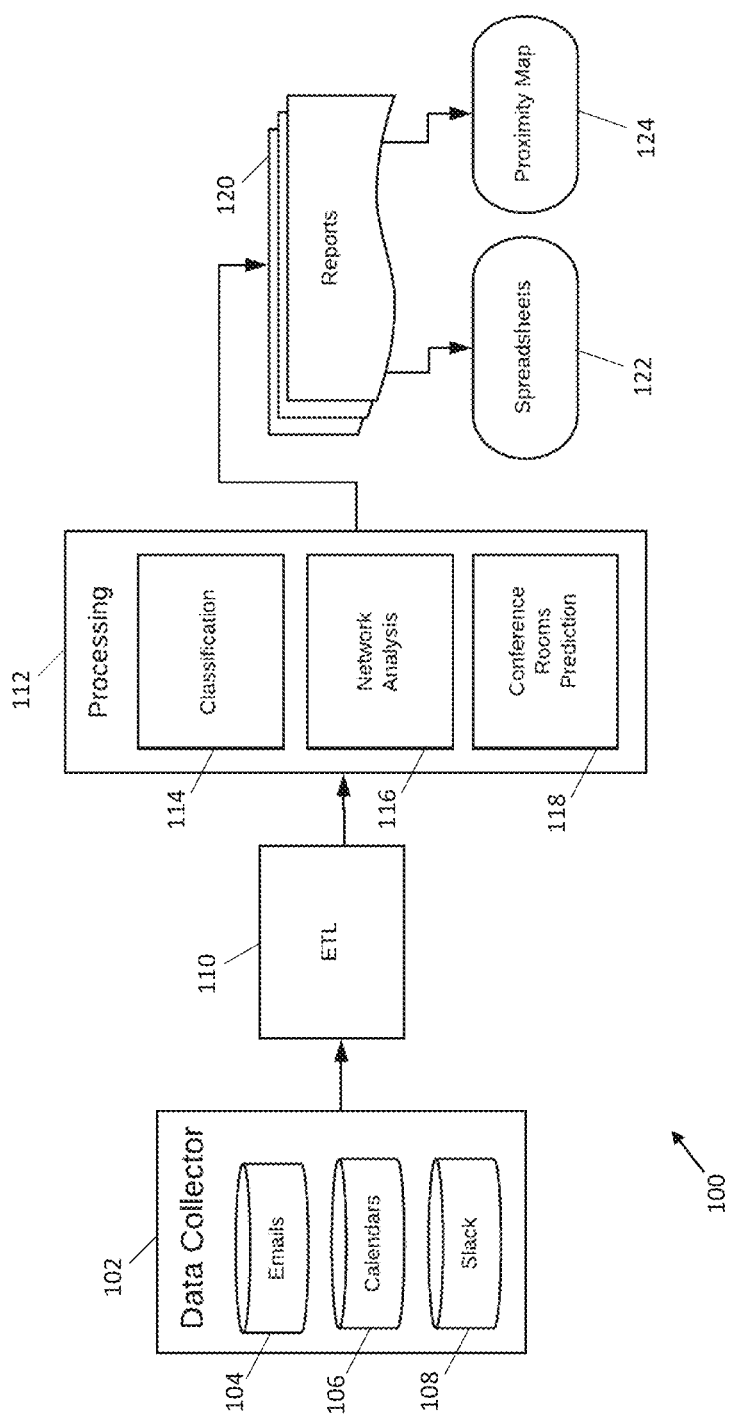
FIG. 1 shows an exemplary architecture of a system according to aspects of the disclosed subject matter.

According to embodiments, the disclosed systems include a discover system configured to discover and extract patterns of communication and collaboration among employees and/or departments within an organization. The term organization described herein, for example, can be a company, or any group of people working or interacting in a physical workspace. The term employee or employees described herein, for example, can include any member of an organization in any position. FIG. 1 shows an exemplary architecture of a discover system 100 according to aspects of the disclosed subject matter. For example, the discover system 100 can include a data monitor/collector 102, an Extract-Transform-Load (ETL) engine 110, a modeling engine 112, and a reporting engine 120.

FIG. 1 shows an exemplary architecture of a system according to aspects of the disclosed subject matter. In some embodiments, as illustrated in FIG. 1, the discover system 100 can include the data monitor/collector 102 configured to monitor and collect metadata information from an organization's digital communications networks or channels and/or digital collaboration networks or channels such as emails 104, calendars 106, digital collaboration tools, such as Slack 108, file sharing from file hosting services, such as Box and Dropbox, workflow tools such as Jira, version control systems such as Git, code commits, etc. Slack 108 is a commercially available product that is designed as a digital communication/collaboration tool, which allows, for example, users to open chatrooms or digital communication/collaboration channels. For example, the data monitor/collector 102 can be incorporated with Slack 108 to provide metadata reports of user membership per chatroom/channel. Box and Dropbox are also commercially available products designed to share digital files. For example, the data monitor/collector 102 can be incorporated with Box and/or Dropbox and collect information on how employees are sharing digital files with each other. For example, the data monitor/collector 102 can collect data on which employees are sharing files on Box or Dropbox. The data monitor/collector 102 can be further configured to collect metadata information of instant messages, chatrooms, or any other forms of digital communications or collaboration. The data monitor/collector 102 can be configured to collect metadata information from a server, e.g., email, calendar, file sharing, or any digital communications servers, of the organization. For example, the data monitor/collector 102 can be configured to gather at least the following from a server: email and instant message metadata communication relationships, calendar information such as meeting metadata, and any other metadata of any digital communications or collaboration. The data monitor/collector 102 can also be configured to collect metadata information from digital communications products such as Microsoft Outlook or Google G-suite. Microsoft Outlook and Google G-suite are commercially available digital communications products. Outlook is a digital communications software suite of email, contacts, tasks, and calendar services from Microsoft. G-suite is also a digital communications software suite of email, instance messenger, calendar, cloud computing services from Google.

In some embodiments, metadata information of an organization's digital communication/collaboration networks or channels can reveal how employees within the organization interact with each other. Metadata information of emails 104, for example, can indicate the senders, receivers, anyone who's been copied, time and size of the emails, title of the emails, number of emails being exchanged, and any other relevant information that can help analyze interactions of the employees. Metadata information of calendars 106, for example, can indicate the organizers, attendees, location, time and purpose of meetings, number of meetings being organized, and any other relevant information that can help analyze interactions of the employees. Metadata information of digital collaboration tools such as Slack 108, for example, can include title, number, organizer, and participants of digital chatrooms; number, sender, receiver, and timestamp of each message in each digital chatroom; and any other relevant information that can help analyze interactions of the employees.

In some embodiments, in order to facilitate a gathering of metadata information, a macro can be installed on an organization's digital communications devices (as well any relevant personal digital communications devices) and a script can be run to allow the data monitor/collector 102 to collect metadata information of digital communications or collaboration. The data monitor/collector 102 can be configured to collect metadata information from any types of digital communications networks or channels during an initial integration phase. The data monitor/collector 102 can be reconfigured, subsequent to the initial integration phase, if metadata information is not being accurately and consistently collected. The data monitor/collector 102 can also be configured to avoid monitoring and collecting the actual content of the digital communications or collaboration. Instead, the data monitor/collector can be configured to monitor and collect only the metadata information of the digital communications or collaboration.

In some embodiments, the data monitor/collector 102 can be configured to collect physical interaction data within an organization. Physical interactions, for example, can be any interactions between employees in person (e.g., in-person meetings, face-to-face conversations, etc.) rather than any interactions in a digital world. Physical interactions, for example, can be in-person interactions between employees for any work or social related purposes. For example, metadata of calendars 106 can indicate physical interactions between employees. In another example, a survey of employees' and/or departments' physical interaction with other employees and/or departments can be conducted to collect physical interaction within an organization. A survey of employees, for example, can ask employees to identify names of other employees that he/she prefers to work with; identify names of other employees that he/she actually works with; identify names of other employees that he/she trusts; identify names of other employees that he/she interacts socially; or any other relevant information that can help analyze interactions of the employees. The data monitor/collector 102 can also be configured to collect general information of each employee in the organization. The general information can include the employee's name, department, gender, age, position/rank, level of interaction with other employees, and any other information relevant to assessing the organization's culture. This general information, for example, can be collected from the organization's human resources department.

In some embodiments, as illustrated in FIG. 1, the discover system 100 can include an Extract-Transform-Load (ETL) engine 110. The ETL engine 110, for example, can be configured to receive data from the data monitor/collector 102, filter the received data, convert the data into a particular format, e.g., a uniform format that can be processed and analyzed by a processing system, and send the formatted data to a modeling engine 112 of the discover system for analysis. The ETL engine 110 can filter the received data from the data monitor/collector 102 in different ways. For example, the ETL engine 110 can be configured to aggregate the received data of all employees into one or more files. For example, aggregated data can include an aggregate of metadata information from emails 104, calendars 106, and digital collaboration tools such as Slack 108, and/or a survey result data. The ETL engine 110 can also be configured to filter out the portion of the received data that relates to external entities. External entities, for example, can be anyone who is not a part of the organization. For example, an email exchange between the organization's employee and a non-employee such as the organization's client/customer can be filtered out. Such communications, in some instances, may not indicate how the employees within the organization interact with each other. In some instances, metadata information from calendars 106 about meetings with outside entities being held at locations outside the organization's workspace can be filtered out. The ETL engine 110 can be also configured to keep some of the received data that relates to external entities. For example, metadata information from an email exchange between several employees of the organization and an outside entity can still reveal how the several employees of the organization interact with each other. Therefore, the ETL engine 110 may not filter out such email exchange metadata. The ETL engine 110, in some instances, may not filter out calendar metadata that relates to in-person meetings even if such meetings are being held with outside entities. For example, such meetings can include several employees of the organization, which can reveal how those employees within the organization interact with each other. In another example, such meetings may be held at locations within the organization's workspace. Any in-person meetings/interactions taking place within the organization's workspace (even if such meetings/interactions include outside entities) may be kept and used to analyze a target number, size, and location of meeting rooms. The ETL engine 110 can also be configured to filter out the portion of the received data that relates to employees who work remotely. The ETL engine 110 can also be configured to filter out the portion of the received calendar data that relates to meetings without any participants other than the organizer of the meeting (e.g., one-person meeting). In some embodiments, the ETL engine 110 can also filter the received data from the data monitor/collector 102 using any combinations of the filtering methods described above. In some embodiments, the ETL engine 110 can convert the data into any format that the modeling engine 112 can process. In some embodiments, the format can be a custom format that allows the modeling engine 112 to efficiently process the metadata information collected by the data monitor/collector 102. In some embodiments, the format can be a graph representation of the metadata information.

Figure 2:
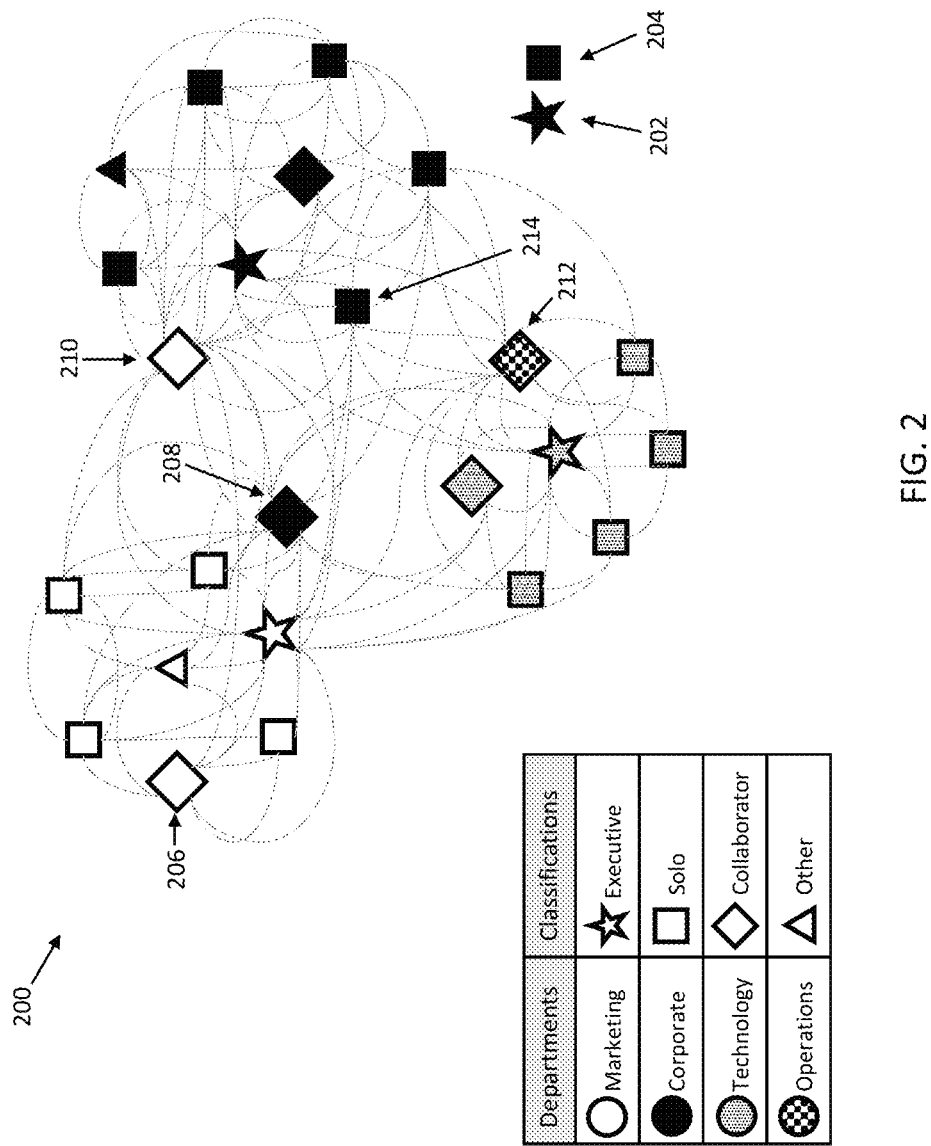
FIG. 2 shows an exemplary proximity map based on departments and classifications according to aspects of the disclosed subject matter.
Figure 3:
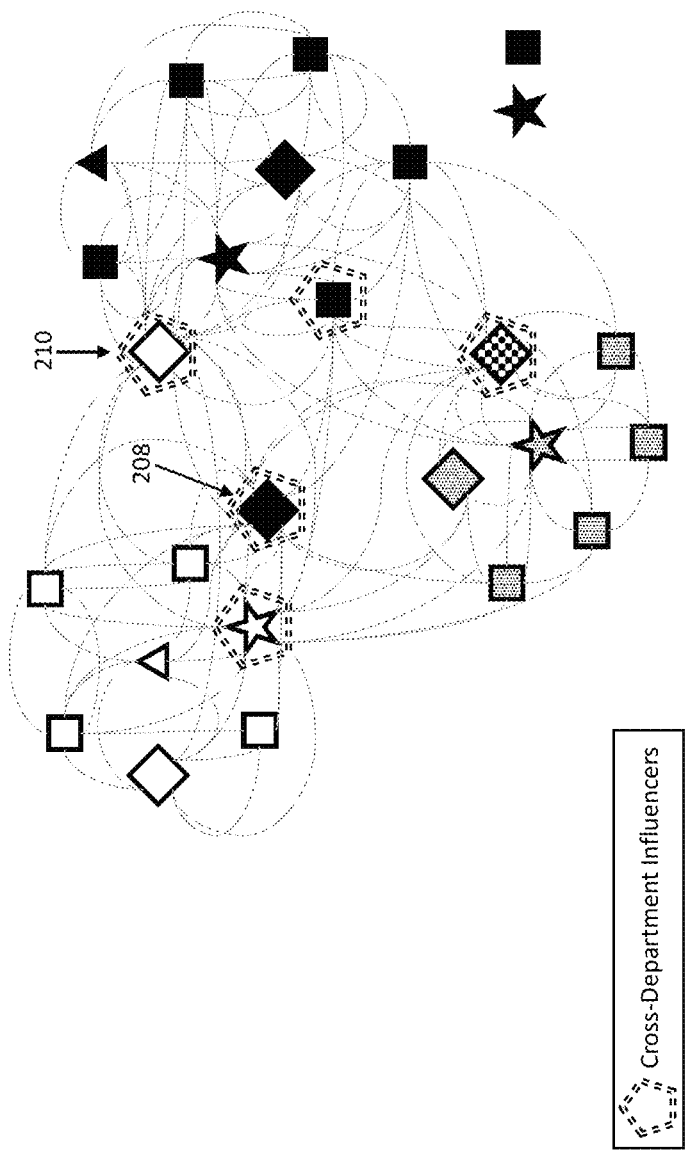
FIG. 3 shows an exemplary proximity map identifying cross-department influencers according to aspects of the disclosed subject matter.
Figure 4:
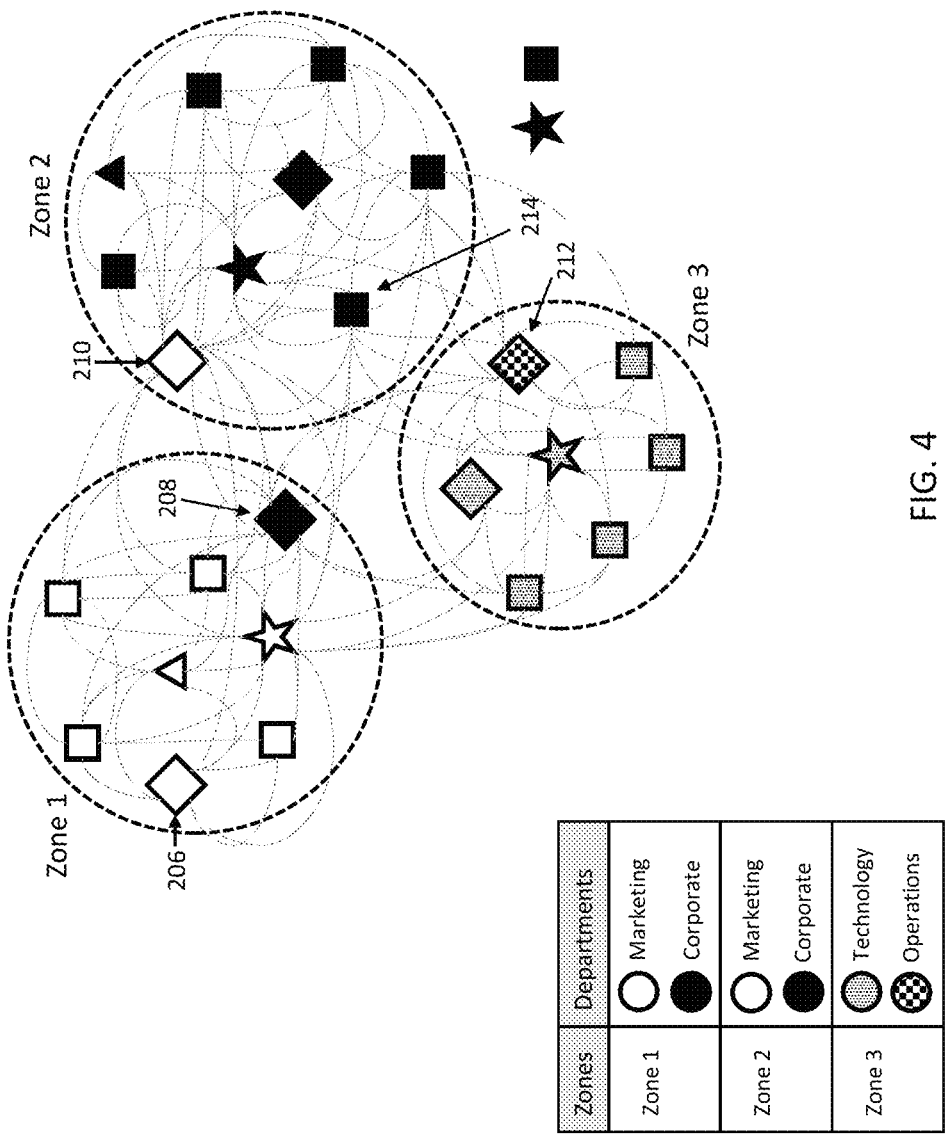
FIG. 4 shows an exemplary proximity map with different zones according to aspects of the disclosed subject matter.

In some embodiments, as illustrated in FIG. 1, the discover system 100 can include a modeling engine 112 configured to generate a target network model by performing a classification 114, a network analysis 116, and a prediction of rooms with a specialized purpose 118 (e.g., conference rooms, phone booths, etc.) based on the data received from the Extract-Transform-Load (ETL) engine 110. For example, the data received from the ETL engine 110 can include metadata information of the organization's digital communications or collaboration. The data received from the ETL engine 110 can also include processed metadata information that has been filtered and converted into a particular format by the ETL engine 110. In some embodiments, the modeling engine 112 can be configured to send the analyzed data (e.g., including the target network model) to the reporting engine 120, which can provide a readable data structure output including, for example, a spreadsheet 122 and/or a proximity map 124. Different versions of an exemplary proximity map 124 are illustrated in FIGS. 2-4, discussed below.

In some embodiments, the modeling engine 112 can be configured to perform the classification 114 by analyzing the data received from the ETL engine 110 and providing a classification of individual nodes (e.g., people, employees, etc.) according to their work style. For example, each organization employee's work style and connection can be classified based on the collected information of the organization. Each organization employee's work style, for example, can be classified into the following categories: "solo," "collaborator," and "other." This classification of work style, for example, can be analyzed based on metadata information from calendars 106. For example, the metadata information from calendars 106 can be analyzed to illustrate a percentage of meeting time or a number of meetings in an employee's workday schedule. In another example, the metadata information from calendars 106 can be analyzed to show the longest duration of non-interrupted time in an employee's work schedule. Such analysis of the calendar metadata information, for example, can be used to assess each employee's work style.

In some embodiments, the "solo" work style can represent an employee who does not schedule many meetings with other employees according to their calendar metadata. For example, an employee who communicates heavily with others via email can be categorized as having the solo work style, if the employee does not hold many meetings with other employees. The solo work style, for example, can represent an employee who does not attend many in-person meetings. In some embodiments, employees may set up a meeting for just themselves without inviting anyone, for example, in an attempt to block out their calendars and possibly to avoid meetings with other employees. In such case, the employees are not meeting with other employees, and therefore, such meetings for just one person (e.g., one-person meeting) can be filtered out when the modeling engine 112 is analyzing the calendar metadata. The modeling engine 112, for example, can categorize an employee's work style by analyzing the in-person meetings that involve two or more people.

In some embodiments, the "collaborator" work style, in contrast to the "solo" work style, can represent employees who schedule many meetings with other employees as reflected by their calendar metadata. The collaborator work style can, for example, represent an employee whose work style involves attending many in-person meetings that involve at least two or more people (e.g., an employee is meeting at least one or more person).

In some embodiments, the threshold for determining the "solo" or the "collaborator" work style based on a number of meetings and/or the longest duration of non-interrupted time can be varied according to the organization's culture. For example, in a certain organization culture where employees do not frequently organize in-person meetings, an employee having just one in-person meeting in a work week could pass the threshold to be categorized as a "collaborator." In an organization where most employees work by scheduling many in-person meetings, an employee having more than ten meetings in a work week may not pass the threshold of a "collaborator." A similar principle can apply when analyzing the longest duration of non-interrupted time in an employee's calendar.

In some embodiments, the classification 114 can be performed by analyzing the means and deviations in the employees' meeting schedules. For example, any unsupervised learning process can be performed to classify the employees. In another example, k-means clustering algorithm can be used to classify the employees into three clusters. Once the employees have been classified into three clusters, one cluster of employees that schedule many in-person meetings and/or have shorter duration of non-interrupted time can be classified as "collaborators." Another cluster of employees that schedule less in-person meetings and/or have longer duration of non-interrupted time can be classified as "solos." In some embodiments, the other work style can represent any work style that does not correlate well to the "solo" or "collaborator" work style. For example, the "other" classification can be the third cluster determined by k-means clustering algorithm that does not conform to the other two clusters (e.g., "solo" and "collaborator" clusters). In some embodiments, a relatively small number of employees are classified as the "other" cluster that does not conform to the "solo" and "collaborator" clusters. For example, a majority of the employees can be classified as the "solo" and "collaborator" clusters, and only a small remaining number of employees can be classified as the "other" cluster. In some embodiments, when designing the office floorplan and the employee placement, the organization may want to place the "solo" work style employees in a quiet area with less traffic. In contrast, the organization may want to place the "collaborator" work style employees in a high traffic area. For example, a high traffic area can be any area near a pathway with heavy employee traffic, or somewhere near a communal area such as a kitchen, library, gym, lobby, recreation room, or any other communal, amenity, or social area. The "collaborator" work style employees placed in a high traffic area can interact with high number of employees and promote the organization's collaboration culture.

In some embodiments, as illustrated in FIG. 1, the modeling engine 112 can also be configured to perform the network analysis 116 of the data received from the ETL engine 110 and create a digital version of the network graph or spatial clustering. For example, the digital network graph or spatial clustering (e.g., proximity maps as shown in FIGS. 2-4) can be mapped based on a collaboration score between each pair of employees. The collaboration score can be based on the level of interaction between the pair of employees. Two employees, for example, who interact frequently with each other can receive a higher collaboration score than employees who rarely interact with each other as reflected by the collected metadata information. This interaction level between the two employees, for example, can be determined by analyzing the collected metadata information of digital communications, collaboration, or meetings between the two employees or meetings that both employees participate in. For example, if the two employees are communicating frequently via email, via digital communication tools such as Slack, and/or by setting up many in-person meetings in their calendars, then the two employees can receive a high collaboration score based on the high number of interactions between the members. In some embodiments, the collaboration score can also reflect survey responses of the employees. For example, the employees can respond to a survey asking for their interaction with other employees, and the collaboration score can incorporate such survey responses. In some embodiments, the digital network graph can be mapped such that each node represents an employee and the distance between the nodes represents the collaboration score. For example, two employees who interact frequently with each other can be represented as two nodes that are placed closer together than two other employees who rarely interact with each other.

In some embodiments, the classification 114 and the network analysis 116 performed by the modeling engine 112 can be sent to the reporting engine 120, which can be reported as a proximity map 124. Exemplary proximity maps are illustrated in FIGS. 2-4.

FIG. 2 shows an exemplary proximity map 200 based on departments and classifications according to aspects of the disclosed subject matter. For example, the proximity map 200 can be an illustration of the network analysis 116 based on the collaboration score between one or more pairs of employees. In FIG. 2, each node represents an employee of the organization. As shown, a level of interaction between two nodes (employees) in the proximity map 200 can be represented by a number of lines that connect the two nodes. Strong interactions are represented by more lines. Some nodes (employees) such as 202 and 204 are not connected by any line because their interactions/communications with other employees within the organization is almost non-existent. The proximity map 200 also shows the classifications of each node (employee) as executive, solo, collaborator, and other. The solo, the collaborator, and the other classifications, for example, can be determined by the classification 114 analysis according to the employee's work style as explained above. The executive classification reflects that node's (employee's) executive position within the organization. Therefore, the proximity map 200, for example, can be a readable output of both the classification 114 and the network analysis 116. In FIG. 2, the solo classification is represented as a square shape; the collaborator classification is represented as a diamond shape; the other classification is represented as a triangle shape; and the executive position is represented as a star shape. The proximity map 200 also shows an illustration of each node based on four departments within the organization: marketing, corporate, technology, and operations. For example, in FIG. 2, nodes with no fill are in the marketing department; nodes with solid fill are in the corporate department; nodes with dotted pattern fill are in the technology department; and a node 212 with checkerboard pattern fill is in the operations department.

In FIG. 2, the strength/frequency of interaction is represented by the lines, which can be mapped based on metadata information of digital communications or collaboration. Such metadata information can reflect interactions via email 104 as well as in-person meetings (e.g., based on metadata information of calendars 106) and other communication tools such as Slack (108). For example, a certain number of email exchanges, in-person meetings, or instant messages between two nodes as indicated by the metadata information can be represented as a number of lines in FIG. 2. Some nodes such as the node 206 has been classified as having the collaborator work style, which can be determined based on the classification 114. But, for example, the node 214, which has been classified as having the solo work style, illustrates much higher level of interaction (more lines connected to other nodes) than the node 206 (fewer lines connected to other nodes). This classification reflects that the node 206, while it has fewer overall interactions with other nodes, mostly interacts with other nodes in in-person meetings. On the other hand, the node 214, while it has more overall interactions with other nodes, mostly interacts with others via emails or other forms of digital communications/collaborations and does not schedule many in-person meetings. The node 214 can therefore be classified as having the solo work style, but at the same time show strong and frequent digital interactions with other employees. The node 206, on the other hand, can be classified as having the collaborator work style based on relatively high number of in-person meetings even though the node 206's overall interactions with other employees are less compared to that of the node 214. In some embodiments, classifying employees based on their physical in-person meeting schedules can help assess the organization's collaboration style culture. This assessment, for example, can be used to determine a target number, size, and allocation of rooms (e.g., conference rooms, phone booths, etc.) for a specialized purpose such as in-person meetings, videoconferences, or teleconferences. Such assessment can be a factor in generating an optimized architectural design. In some embodiments, such assessment can be performed in connection with the prediction of rooms with specialized purpose 118 (e.g., conference rooms, phone booths, etc.) as shown in FIG. 2.

FIG. 3 shows an exemplary proximity map identifying cross-department influencers according to aspects of the disclosed subject matter. The cross-department influencers are the employees within the organization who interact frequently with employees in other departments. For example, the cross-department influencers can be an employee who communicates or collaborates (e.g., over the digital communications or collaboration networks of the organization) with a predetermined number of employees in other departments. In another example, the cross-department influencers can be an employee who communicates or collaborates with at least a predetermined number of employees in other departments with a frequency of interaction that can satisfy a threshold level (e.g., communicates or collaborates with an employee at another department at least once a week, etc.). In some embodiments, the modeling engine 112 can be configured to identify the cross-department influencers within the organization as a part of the classification 114 and/or the network analysis 116. The cross-department influencers are identified in FIG. 3 with a dotted pentagon shape. For example, the node 210 is a cross-department influencer identified with a dotted pentagon shape. The node 210 shows high level of interaction with both the marketing nodes and the corporate nodes. The node 210 therefore represents an employee in the marketing department who interacts frequently with the employees in the corporate department. In some embodiments, identifying the cross-department influencers can help assess the workflow aspects of an organization's culture. Some work from one department can flow to another department through the cross-department influencer nodes. For example, in FIG. 3, some work from the corporate department can flow to the marketing department and vice versa through the node 210 which shows a high level of interaction with both the marketing nodes and the corporate nodes. The cross-department influencers can also reflect aspects of the organization's overall collaboration culture. Therefore, the cross-department influencers such as the node 210 can be a factor in generating an optimized office floorplan. In some embodiments, when designing the office floorplan and the employee placement, the organization may want to place the cross-department influencers in an approachable environment that can encourage interaction. For example, the cross-department influencers can be assigned near a pathway with large employee traffic, or somewhere near a communal area such as a kitchen, library, gym, lobby, recreation room, or any other communal, amenity, or social area where the cross-department influencers can interact with a high number of employees and promote the organization's collaboration culture.

In some embodiments, the modeling engine 112 can be configured to identify highly-connected employees as a part of the classification 114 and/or the network analysis 116. For example, highly-connected employees can be employees who communicate, collaborate, and/or meet frequently with many of the other employees in the organization. In another example, a highly-connected employee can be an employee who communicates, collaborates, and/or schedules calendar meetings (e.g., over the digital communications or collaboration network of the organization) with at least a predetermined number of other employees in the organization. In another example, a highly-connected employee can be an employee who communicates, collaborates, and/or schedules calendar meetings with a predetermined number of other employees in the organization with a frequency of interaction that can satisfy a threshold level (e.g., communicates, collaborates and/or schedules calendar meetings with another employee at least once a week, etc.). For example, highly-connected employees can be employees who are directly or indirectly connected with more than, e.g., 50% of the entire employees, e.g., via digital communication means and/or via physical meetings. For example, highly-connected employees can be directly connected to the other employees, e.g., direct communication via digital communication means and/or physical meetings. Alternatively, highly-connected employees can also be indirectly connected to many of other employees. For example, a highly-connected employee can indirectly communicate with an employee only through other employees. For example, an employee A (e.g., a chief executive officer) may interact with an employee C (e.g., an associate) only through an employee B (e.g., a mid-level manager). For example, A can ask B to have C do certain tasks within the organization, and C knows that he/she is being asked by A to perform such tasks. Once C completes such tasks, he/she can ask B to report back to A. In such case, the employee A can be indirectly communicating with C. Based on the collaboration culture of the organization, the connection threshold, e.g., 50%, for identifying the highly-connected employees can be changed to anything between 1-100% of a connection rate threshold. For example, in an organization with high collaboration culture, highly-connected employees can be employees who are directly/indirectly connected with 75% or more of the entire employees in the organization. In another example, in an organization with low collaboration culture, highly-connected employees can be employees who are connected with 30% or more of the entire employees in the organization. In some embodiments, highly-connected employees can be identified based on digital interaction data (e.g., metadata information of digital communications or collaboration) as well as physical interaction data (e.g., a survey) within the organization. In some embodiments, when designing the office floorplan and the employee placement, the organization may want to place the highly-connected employees in an approachable environment that can encourage interaction. For example, the highly-connected employees can be placed near a pathway with heavy employee traffic, or somewhere near a communal area such as a kitchen, library, gym, lobby, recreation room, or any other communal, amenity, or social area where the highly-connected employees can interact with a high number of employees and promote the organization's collaboration culture.

FIG. 4 shows an exemplary proximity map with different zones (e.g., virtual communities) according to aspects of the disclosed subject matter. The modeling engine 112 can be configured to identify different zones within the organization based on the network analysis 116. The zones can be a group of employees within the organization with a high level of interaction. The modeling engine 112 can be configured to perform the network analysis 116 to identify different zones based on the collaboration scores. For example, a group of employees within the organization with high collaboration scores can be identified as a zone. In some embodiments, the Louvain method for community detection can be used to detect the zones within the organization (V. D. Blondel et al., Fast unfolding of communities in large networks, J. Stat. Mech. (2008) P10008; herein incorporated by reference in its entirety). For example, the modeling engine 112 can be configured to apply the Louvain method as a part of the network analysis 116 to detect zones within the organization. In FIG. 4, for example, the nodes within Zone 1 show high level of interaction with each other. Therefore, Zone 1 can be one of the zones within the organization. Similarly, the nodes within Zone 2 show high level of interaction with each other, and the nodes within Zone 3 also show high level of interaction with each other. Therefore, Zone 2 and Zone 3 can also be zones within the organization.

In some embodiments, the zones are detected based on the level of collaborations or interactions and this may not necessarily relate to the departments. For example, in FIG. 4, the node 210 is in the marketing department. But the node 210 shows a higher level of interaction with the employees in the corporate department, therefore the node 210 based on the collaboration score (e.g., level of interaction) can be detected as forming a zone (Zone 2) with the corporate employees in Zone 2. As illustrated in FIG. 4, the node 210 is connected with more lines (e.g., representing a higher level of interaction) with the corporate department employees in Zone 2, and fewer lines (e.g., representing a lower level of interaction) with the marketing department employees shown in Zone 1 or the technology and operations employees shown in Zone 3. In such example, the modeling engine 112 can be configured to identify the node 210 (e.g., a marketing employee) as forming Zone 2 with the corporate employees based on the network analysis 116. In another example, the node 208 is a corporate employee, and FIG. 4 illustrates the node 208 as being connected with more lines (e.g., representing a higher level of interaction) with the marketing employees in Zone 1, and fewer lines (e.g., representing a lower level of interaction) with the corporate employees in Zone 2 or the technology and operations employees shown in Zone 3. In such example, the modeling engine 112 can be configured to identify the node 208 (e.g., a corporate employee) as forming Zone 1 with the marketing employees based on the network analysis 116.

In some embodiments, as illustrated in FIG. 1, the modeling engine 112 can also be configured to perform the prediction of rooms with specialized purpose 118 by analyzing the data received from the ETL engine and identifying a target number, size, and location of the rooms with a specialized purpose such as conference rooms. A room with a specialized purpose, for example, can include a conference room, a meeting room, a board room, a phone booth, or any area, room or space within the workspace where employees can interact with others (e.g., meeting, call, videoconference, etc.). In some embodiments, the modeling engine 112 can also optimize the number, the size, and the allocation of the rooms for a specialized purpose per zone. For example, calendar metadata of each employee within the zone can be analyzed to determine their meeting work style. For example, a number of attendances in a given meeting, a number of meetings in a workday that are being organized, a duration of those meetings, and any other relevant information can be considered to classify the employee's in-person meeting work style. Based on analyzing the meetings being organized and the duration of the corresponding meetings, the modeling engine 112 can calculate the number, the size, and the allocation of the rooms with a specialized purpose for each zone. For example, if employees within Zone 1 often hold three separate meetings at a given time that require three meeting rooms with certain sizes, but employees within Zone 1 very rarely hold more than three separate meetings at a given time, then the modeling engine 112 can determine that a target number of meeting rooms for Zone 1 can be three. In another example, if employees within Zone 1 often hold in-person meetings involving five people, then the modeling engine 112 can determine that a target size of meeting rooms for Zone 1 is a room that is big enough to occupy five people. In another example, if employees in Zone 1 rarely organize in-person meetings, and in those rare instances, Zone 1 employees only join meetings that are predominantly attended by employees in other Zones (e.g., Zone 2 or Zone 3), then the modeling engine 112 can determine that allocation of meeting rooms in Zone 1 is unnecessary.

In some embodiments, the modeling engine 112 can be configured to perform the classification 114, the network analysis 116, and the prediction of rooms with specialized purpose 118 (e.g., conference rooms, phone booths, etc.) and output the target network model that can include: (1) classification of each employee based on his/her work style; (2) collaboration score (e.g., level of interaction) between each pair of employees; (3) spatial clustering of employees into zones (e.g., virtual communities) by level of collaboration; (4) spatial clustering of departments by level of collaboration; (5) classification of highly-connected employees; (6) classification of cross-department influencers; (7) prediction of target number, size, and allocation of the rooms with a specialized purpose (e.g., conference rooms, phone booths, etc.) per zone. In some embodiments, the target network model generated by the modeling engine 112 can be used as a model for generating the architectural designs.

In some embodiments, as illustrated in FIG. 1, the discover system 100 can include the reporting engine 120. The reporting engine 120 can be configured to receive output, such as the target network model, from the modeling engine 112 and generate readable output that can include a data structure including spreadsheets 122. The reporting engine 120 can also output a proximity map 124. The data structure generated by the reporting engine 120 can include lists of each employee including their role and/or individual score such as a collaboration score, any analysis performed by the discover system 100, and any data collected by the data monitor/collector 102. These lists, for example, can be in a format of spreadsheets 122, tables, texts, or any other data structure formats. Spreadsheets 122, for example, can be lists of employees with their interactions with other employees (e.g., names of other employees with frequent interactions, collaboration score, etc.), their work style and classifications (e.g., solo, collaborator, other, highly-connected employee, cross-department influencer, etc.), their positions within the organization, and any other information necessary to assess the organization's culture. The reporting engine 120 can also generate a proximity map 124. FIGS. 2-4 illustrate different examples of the proximity map 124 as explained above in details.

In some embodiments, the discover system 100 can include a user interface. A user interface, for example, can provide an output on a display device (e.g., a monitor, a projector, etc.) to present a proximity map 124, a data structure including spreadsheets 122, any input of the discover system (e.g., metadata of digital communications or collaboration), or any output of the discover system (e.g., a target network model). A user interface, for example, can receive the output of the reporting engine 120 and present the output to a user (e.g., a member of the organization designing its office floor plan, an architect, or anyone using the user interface) on a display device. A user interface, for example, can display a proximity map that is similar or analogous to the exemplary proximity maps illustrated in FIGS. 2-4. In another example, a user interface can indicate (e.g., on a display device) a data monitor/collection status of the data monitor/collector 102, an extract-transform-load status of the ETL engine 112, and/or a processing status of the modeling engine 112. In another example, a user interface can be configured to receive one or more inputs from a user to control the data monitor/collection of the data monitor/collector 102, an extract-transform-load process of the ETL engine 112, and/or a target network model processing of the modeling engine 112. In some embodiments, a user interface can be a part of the data monitor/collector 102, the ETL engine 110, the modeling engine 112, and/or the reporting engine 120. In some other embodiments, a user interface can be a separate component.

In some embodiments, the discover system 100 can include one or more processors and memory. The memory can be configured to store a software application (e.g., executable instructions), for example, for the data monitor/collector 102, the ETL engine 110, the modeling engine 112, the reporting engine 120, a user interface, etc. The processor can be configured to run the software application stored in the memory. Such processor and memory can be a part of the data monitor/collector 102, the ETL engine 110, the modeling engine 112, and/or the reporting engine 120.

Figure 5:
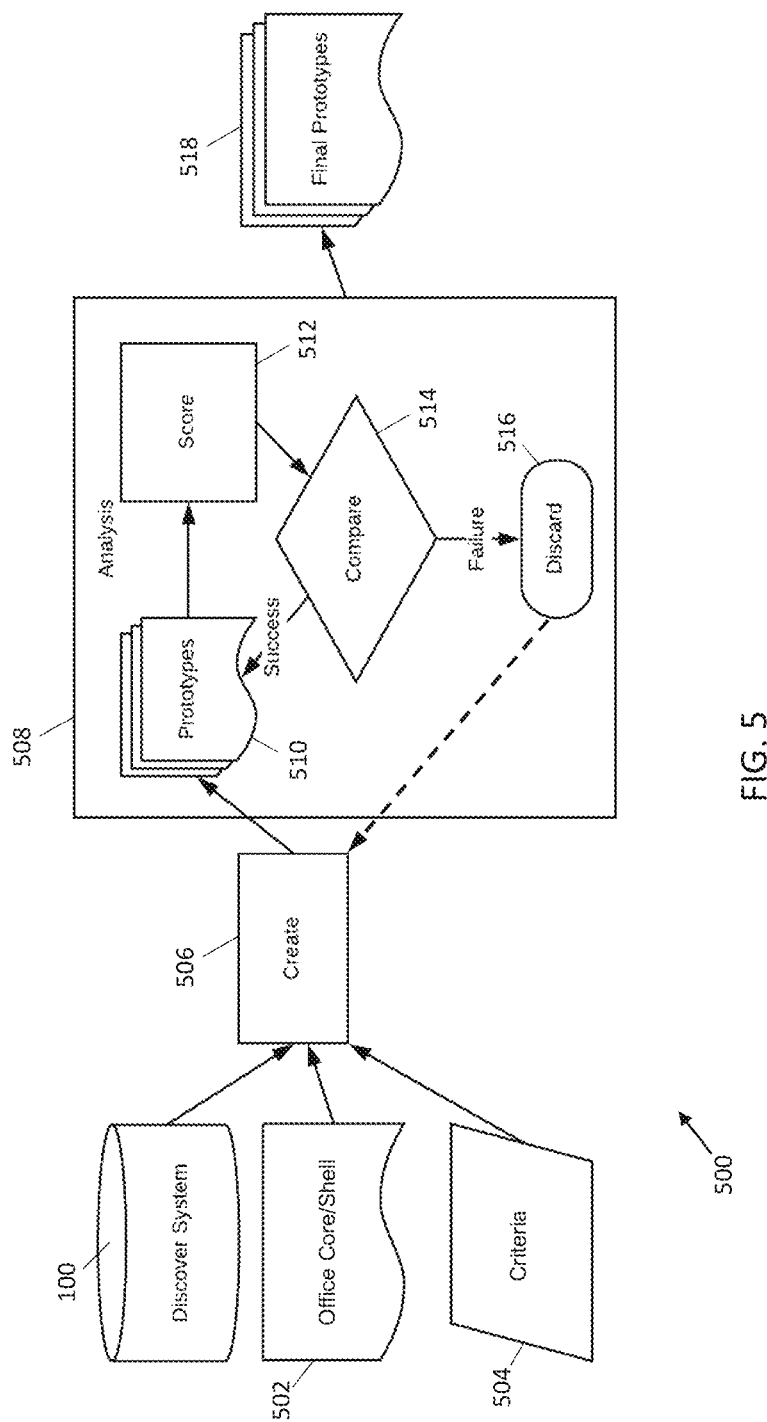
FIG. 5 shows an exemplary architecture of a system according to aspects of the disclosed subject matter.
Figure 6:
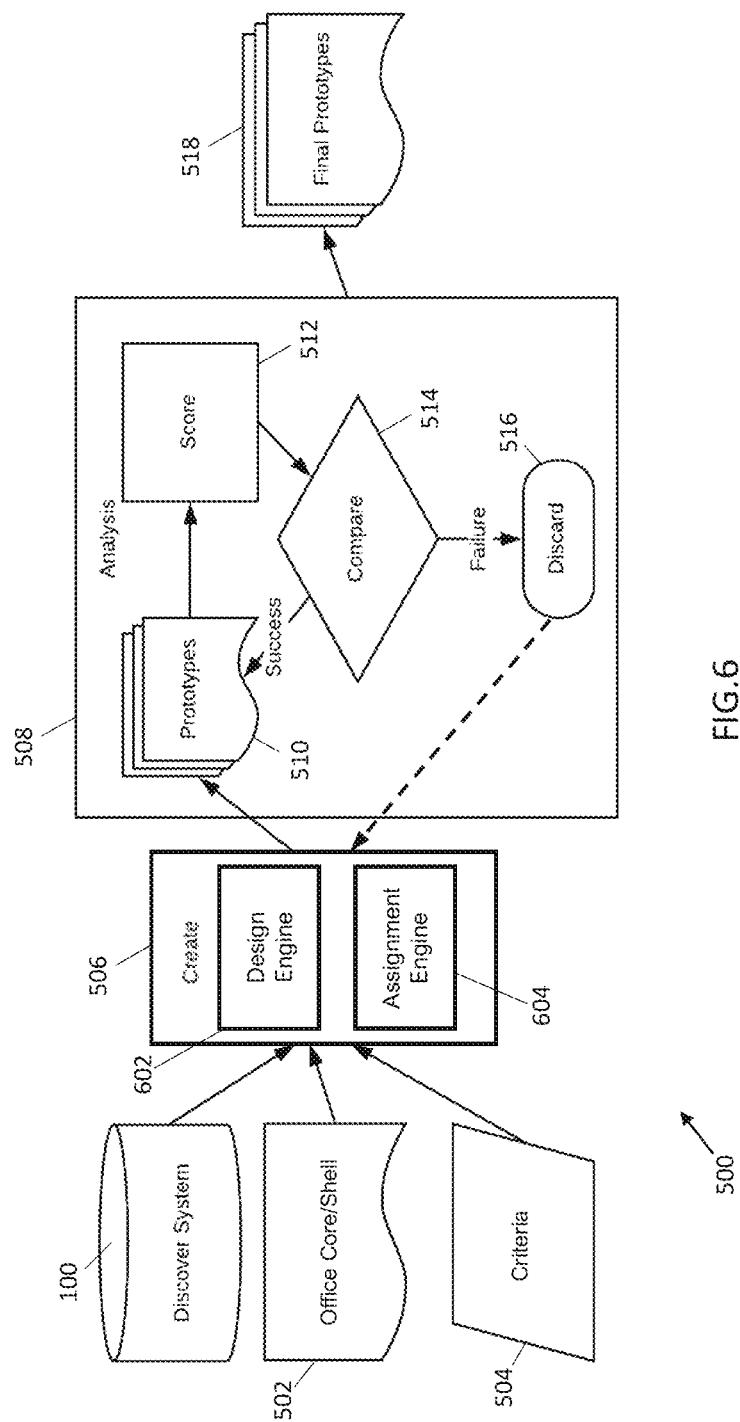
FIG. 6 shows an exemplary architecture of a system according to aspects of the disclosed subject matter.

FIGS. 5 and 6 show an exemplary architecture of a system according to aspects of the disclosed subject matter. According to embodiments, the disclosed design system 500 can be configured to analyze output data of the discover system 100, a specified office core/shell 502, and different criteria 504 to automatically generate data-driven optimized office floorplan prototypes 518 based on an organization's culture and/or goals. For example, the design system 500 can receive the data generated by the discover system 100 and integrate the discover system data with a specified office core/shell 502 and criteria 504. The design system 500 further includes a design generator 506 configured to generate office design prototypes, a design analyzer 508 to optimize the office design prototypes, and a final set of optimized office design prototypes 518. In some embodiments, the data generated (e.g., a target network model) by the discover system 100 can include (1) a data structure that can include lists of employees with their role and/or collaboration score, (2) a proximity map 124 in different versions as described above, (3) target number, size, and allocation of the rooms with a specialized purpose, (4) cross-department influencers, (5) highly-connected employees, and/or any data or model relevant in generating data-driven optimized office floorplan prototypes 518.

In some embodiments, a specified office core/shell 502 can represent any type of physical core/shell of an empty office with a few fixed variables. Fixed variables, for example, can include outer walls, internal loadbearing structures, stairs, and/or elevators that are difficult to alter. In another example, fixed variables can be determined based on local laws and regulations. For example, due to safety concerns, a local law and regulation may require a certain number and location of fire escapes to remain unaltered and/or require only a limited number of people to work in a given office space. In some embodiments, a specified office core/shell 502 can be an empty floorplan of the organization's current workspace or one of the organization's future workspace where the organization can move-in. An exemplary empty floorplan can include outer walls, internal loadbearing structures, stairs, and elevators that are difficult to alter. In yet another example, an exemplary empty floorplan can also include a certain number and location of fire escapes mandated by local laws and regulations.

In some embodiments, an empty floorplan, for example, may not include internal layouts such as internal walls (e.g., walls not designed to be main structural components), rooms and areas (e.g., rooms and areas can be formed based on internal walls), internal doors, furniture, appliances, or any physical components in a floorplan that are not considered as fixed variables. An empty floorplan, for example, may not also include the intended use of internal layouts such as placement of employees, assignment of various rooms and areas as office rooms or work areas; as rooms with a specialized purpose (e.g., conference rooms, phone booths, etc.); or as communal, amenity, or social spaces (e.g., library, kitchen, lobby, gym, recreation room, etc.).

In some embodiments, the design system 500 can be configured to automatically generate data-driven optimized office floorplan prototypes 518 based on criteria 504, such as cost, efficiency, growth, wellness, $CO_2$ level, sunlight exposure, community, zone cohesion, total cohesion, zone adjacency, structured collaboration, informal collaboration, work style, focus, choice, privacy, vibrancy, mobility or any other factors relevant for promoting an organization's culture and/or goals. In some embodiments, an organization may select any combinations of different criteria 504 (e.g., depending on its culture and/or goals) for automatically generating data-driven optimized office floorplan prototypes 518. For example, as illustrated in FIGS. 11-14 (more detailed descriptions of FIGS. 11-14 are provided below), an organization may select a combination of five criteria 504: cost, wellness, community, work style, and choice. In another example, as illustrated in FIGS. 15-18 (more detailed descriptions of FIGS. 15-18 are provided below), an organization may select a combination of seven criteria 504: cost, wellness, community, work style, choice, privacy, and vibrancy. In some embodiments, criteria scores for a certain office design prototype 510 can be determined by correlating an output of the discover system 100 (e.g., a target network model) with the office design prototype 100 as described herein.

The cost criterion, for example, can include an overall monetary expense for the physical workspace and the architectural layout. The cost can differ based on the workspace's overall area and the layout. For example, a workspace with a greater area in square feet can incur higher cost. In another example, cost criterion can be calculated based on the sum of the cost of all internal layouts (e.g., cost of configuring internal walls, doors, furniture, appliances, etc.) in the office design prototypes. In some embodiments, as sub-categories of the cost criterion, or as separate criteria, efficiency and growth criteria can be scored.

In some embodiments, the efficiency criterion can include the utilization level of rooms or any area where employees can work. For example, the efficiency criterion can be scored based on the total number of the office design prototype's internal layouts that can be used as space where employees can work (e.g., a desk space, conference room space, etc. where an employee can work) compared with a certain threshold occupancy level of the office design prototypes (e.g., by local laws or regulations limiting the total number of occupancy, a rule of thumb that a person needs about one hundred square feet of office space, or any other rules indicating a threshold level of occupancy). For example, when using the rule of thumb that a person needs about one hundred square feet of office space, and when the total office space is a thousand square feet for ten employees, then the efficiency level is one hundred percent. In some embodiments, a high efficiency level/score can suggest that there is not enough space for employees to conduct meetings (e.g., conference rooms), address private matters, or have alternative seating. Such lack of options, for example, can result in low scores for other criteria.

In some embodiments, the growth criterion can represent a surplus amount of internal layouts where an employee can work. For example, the growth criterion can be scored by calculating the total amount of internal layouts in the office design prototype where an employee can work (e.g., desk area, conference room area, etc.) and comparing that number with the total number of employees. For example, when there are thirty different internal layouts in the office design prototype where employees can work, and the organization has fifteen employees, then the growth potential can be calculated by subtracting the two numbers (e.g., fifteen extra space where employees can work) or dividing the two numbers (e.g., the office design prototype include a surplus amounts of internal layouts where an employee can work that is twice the number of the current employees). In this example, the organization can potentially hire 15 more employees (or double the number of current employees) and the office design prototype being evaluated includes enough internal layouts where those extra employees can work.

The wellness criterion, for example, can include access to natural light, access to windows, $CO_2$ levels, noise levels, and/or any other factors that can affect wellness of human beings. The $CO_2$ levels in the wellness criterion can be determined by how closely the employees are placed from each other. If a high number of employees are placed close to each other, the $CO_2$ levels may rise, which in turn can adversely affect the scoring of the wellness criterion. In contrast, if employees are placed farther away from each other, the $CO_2$ levels may decline, which in turn can improve the scoring of the wellness criterion. Therefore, the $CO_2$ levels can be directly related to the density of the office space (e.g., a number of square feet per employee). A similar concept can apply to calculating noise levels, if a high number of employees are placed close to each other, the noise levels may rise, which in turn can adversely affect the wellness scoring. In contrast, if employees are placed farther away from each other, the noise levels may decline, which in turn can improve the wellness scoring.

The community criterion, for example, can include overall conduciveness toward cooperation as modeled by the discover system 100. For example, if employees with a high level of interaction (e.g., two employees can communicate with each other frequently and therefore have a high collaboration score) are placed closer to each other in a physical workspace, then such employee placement can promote cooperation between employees. Such employee placement, for example, can result in high community scoring. In contrast, for example, if employees who rarely interact with each other (e.g., two employees almost never communicate with each other and therefore have a low collaboration score) are placed closer to each other, then such employee placement can adversely affect the community scoring. In another example, allocation of communal, amenity, or social spaces such as kitchen, library, gym, lobby, recreation room (e.g., with pool table, foosball table, ping pong table, TV, board games, or any other setting where employees can relax or play games), etc. in a way that can increase serendipity can result in high community scoring. The term serendipity described herein, for example, can be an office workspace design where employees can bump into each other more frequently in an unplanned way and increase the chance that such employees can collaborate with each other. For example, employees can run into each other at a kitchen without a formal plan and can start discussing next projects. In some embodiments, as sub-categories of the community criterion, or as separate criteria, zone cohesion, total cohesion, zone adjacency, structured collaboration, and/or informal collaboration criteria can be scored.

In some embodiments, the zone cohesion criterion, for example, can represent the physical placement of employees within each zone (e.g., as illustrated in an exemplary proximity map with different zones in FIG. 4). For example, the zone cohesion criterion can be scored based on the physical distance between where the employees of a certain zone are located/assigned. In some cases, the zone cohesion criterion can be scored based on the physical distances of pairs of employees in a certain zone. The physical distance between a pair of employees, for example, can be calculated based on where the employees are located or assigned in the office design prototypes.

In some embodiments, such physical distances of pairs of employees within a certain zone can be compared with the discover system 100's network analysis 116 of spatial clustering of employees into zones (e.g., virtual communities) based on the level of digital collaboration (e.g., as illustrated in an exemplary proximity map with different zones in FIG. 4). For example, the zone cohesion criterion can be calculated to have a high score if the physical distances of all possible pairs of employees in each zone for the office design prototype match well with the distances of the same pairs of employees for the same zone as computed by the network analysis 116. In one example, average physical distances of pairs of employees in each zone as assigned/located in the office design prototype can be compared with average distances of the same pairs for the same zone as computed by the network analysis 116.

In some embodiments, the total cohesion criterion can represent the physical distances between all employees of the organization (e.g., can be scored based on the physical distances between all of the employees). For example, the total cohesion criterion can be scored based on the physical distance of pairs of employees in the organization. The physical distance between a pair of employees can be calculated based on where the employees are located or assigned in the office design prototypes. In some embodiments, such physical distances of pairs of employees in the organization can be compared with the discover system 100's network analysis 116 of spatial clustering of employees based on the level of digital collaboration (e.g., as illustrated in an exemplary proximity map in FIG. 2). For example, the total cohesion criterion can be calculated to have a high score if the difference between (1) the physical distances of pairs of employees in the organization for the office design prototype and (2) the distances of the same pairs of employees as computed by the network analysis 116 is small (e.g., less than a predetermined threshold). In one example, the total cohesion criterion can be calculated to have a high score if the difference between (1) the average physical distance of pairs of employees in the organization as assigned/located in the office design prototype and (2) the average distance of the same pairs for as computed by the network analysis 116 is small.

In some embodiments, the zone adjacency criterion can represent the physical distances between adjacent zones. For example, the total cohesion criterion can represent the physical distances between employees of the organization (e.g., the total cohesion analyzes the cohesion of the organization at a higher level because it analyzes the employees of the entire organization), whereas the zone cohesion criterion can represent the physical distances between employees within a certain zones (e.g., a zone level analyzes the cohesion of the organization at a lower level because it analyzes the employees at a zone of the organization). The zone adjacency criterion, for example, can represent the cohesion of the organization in between the total cohesion criterion and the zone cohesion criterion (e.g., between the higher organizational level cohesion and the lower zone level cohesion). For example, the zone adjacency criterion can be calculated, by first creating ad hoc zones comprising two or more neighboring zones (e.g., based on the exemplary proximity map with different zones in FIG. 4, the following ad hoc zones that include the adjacent zones can be created: an ad hoc zone with zone 1 and zone 2; an ad hoc zone with zone 1 and zone 3; an ad hoc zone with zone 2 and zone 3; and an ad hoc zone with zone 1, zone 2 and zone 3).

In some embodiments, physical distances of the pairs of employees in the ad hoc zone in the office design prototype can be determined and compared with the distances of the same pairs of employees in the same ad hoc zone as computed in the spatial clustering of employees into zones by the discover system 100's network analysis 116. For example, the zone adjacency criterion can be calculated to have high score if the physical distances of all pair of employees in the ad hoc zone in the office design prototype match well with the distances of the same pairs of employees in the same ad hoc zone as computed in the spatial clustering of employees into zones by the discover system 100's network analysis 116. In one example, the average physical distances of pairs of employees in each ad hoc zone as assigned/located in the office design prototype can be compared with the average distances of the same pairs for the same ad hoc zone as computed by the network analysis 116. In another example, physical distances between pairs of employees can be calculated and compared where one employee in a pair is in one zone and the other employee in the pair is from another zone. In some embodiments, the zone adjacency criterion can represent the physical distances between all of the zones (and not just the zones that are adjacent to each other).

In some embodiments, the structured collaboration criterion can represent the degree at which a certain office design prototype meets the prediction of rooms with specialized purpose 118 for each zone. For example, as described herein, a discover system 100 can be configured to identify a target number, size, and location of the rooms with a specialized purpose such as conference rooms for each zone (e.g., as illustrated in an exemplary proximity map with different zones in FIG. 4). For example, the structured collaboration criterion can be calculated by comparing the target number, size, and location of rooms with a specialized purpose such as conference rooms for each zone as determined in the office design prototype and as calculated by the discover system 100's prediction of rooms with specialized purpose 118 for each zone. For example, the structured collaboration criterion can be calculated to have a high score if each zone in the office design prototype has the target number, size, and location of rooms with a specialized purpose as predicted by the rooms with specialized purpose analysis 118.

In some embodiments, the informal collaboration criterion can represent allocation of communal, amenity, or social spaces. For example, the informal collaboration criterion can be calculated based on a ratio of a number of communal, amenity, or social spaces to a number of spaces where employees can work. In some embodiments, the ratio of a number of communal, amenity, or social spaces to a number of spaces where employees can work can be calculated for each zone. For example, a higher ratio (e.g., higher number of communal, amenity, or social spaces for a given number of spaces where employees can work) can result in higher informal collaboration criterion score. In some embodiments, the informal collaboration criterion can also represent placement of "collaborator" type employees (e.g., employees workstyle involves attending many in-person meetings) near communal, amenity, or social spaces. For example, the informal collaboration criterion score can be calculated based on the ratio of communal, amenity, or social spaces for a given number of spaces where employees can work as well as the physical distance between communal, amenity, or social spaces and the nearest "collaborator" type employees. In some embodiments, the placement of "collaborator" type employees near communal, amenity, or social spaces can be scored as part of the work style criterion.

The work style criterion, for example, can include an overall adaptiveness to different work behaviors of the employees in the organization as determined by the discover system 100. For example, an employee with a "solo" work style, may not prefer to physically interact with other employees and may prefer to be placed at a quiet area of the office workspace with less traffic (e.g., far away from any communal, amenity, or social spaces). Such placement of solo work style employees, for example, can result in high work style criterion scoring. In another example, an employee with a "collaborator" work style may prefer to physically interact with other employees and conduct many in-person meetings. The collaborator work style employees, for example, may prefer to be placed closer to each other and/or placed in a high traffic area (e.g., close to any communal, amenity, or social spaces). Such placement of collaborator work style employees can result in high work style scoring. If collaborator employees are placed in such arrangements to foster physical interactions, for example, it can increase serendipity (e.g., collaborator employees are informally meeting other employees), which can promote an organization's collaboration culture. If collaborator employees are having more informal meetings, then this can reduce the number and duration of formal meetings in the collaborator employees' calendars. Therefore, one example of scoring the work style criterion can be performed by analyzing the changes in collaborator employees' meeting schedules.

In some embodiments, as sub-categories of the community criterion, or as a separate criterion, a focus criterion can be scored.

In some embodiments, the focus criterion can represent the office design prototype's adaptiveness to focus type employees such as "solo" workstyle employees who may prefer to be placed at quiet area where they can focus on their work (e.g., far away from high traffic area such as communal, amenity, or social spaces; or far away from other employees).

The choice criterion, for example, can include measure of options for alterative seating/space for each employee within the workspace environment. In some embodiments, each employee has his/her own designated seat/space for work. The choice criterion, for example, can be availability of alternative seating in the workspace. For example, the choice criterion can be a number of free-floating seats in a library, coffee table, lobby, outdoor space seating that is a part of the workspace, and any other additional seating/space within the workspace where employees can work. In some embodiments, an organization can have only floating workspace without a dedicated space (e.g., office room, desk, etc.) or a seat for each employee. In such case, the choice criterion can be calculated by analyzing the number of additional space/seats in comparison to the total number of employees.

The privacy criterion, for example, can involve layouts and/or assignments of workspace that can provide physical privacy to employees (e.g., an individual or group of people to be able to seclude themselves from others) when it is desirable. For example, employees may prefer to have a private space to have a call with a doctor, a lawyer, an accountant, a customer service representative, etc., to discuss private or confidential matters; a call with a family member and/or a friend to discuss family or personal issues (e.g., personal/family emergency, news, etc.); or to address any personal issues that the employees may consider as private and may not want others to know about, hear, or see. In such cases, for example, it may be desirable to provide private spaces for employees to address any personal issues. Therefore, one example of scoring the privacy criterion can be performed by analyzing the layouts and/or assignments of workspace that can allow employees to attend to any personal issues in a private way. For example, a number of private conference rooms, private phone booths, etc. in comparison to the total number of employees (e.g., employees without a private office) can be analyzed to score the privacy criterion. For example, employees with a private office can address their personal matters in their private office. In some embodiments, such analysis can be performed in connection with the prediction of rooms with specialized purpose 118 (e.g., conference rooms, phone booths, etc.) as described herein. For example, some rooms with specialized purpose, such as a conference room, a meeting room, a board room, a phone booth, or any room that are mainly used for business related meetings, calls, videoconferences, etc., can also be used as additional privacy options if such rooms can provide physical privacy to employees when not in use for its main specialized purpose (e.g., for business related meetings, calls, videoconferences, etc.).

The vibrancy criterion, for example, can involve layouts and/or assignments of workspace with an appearance of vibrancy, liveliness, high-energy, etc. For example, workspace with open layouts with many employees working in an open space may appear vibrant if many of those employees in the open space are generally visible to each other or to anyone with a line of sight to the open space. Entering such open space and seeing many people present in the open space can provide an appearance of vibrancy, liveliness, or high-energy in the area. Such workspace layouts and/or assignments can receive high vibrancy criterion score. In another example, workspace with closed-off layouts (e.g., with many walls), even with many employees working in the closed-off space, may appear less vibrant if many of those employees in the closed-off space are generally not visible to each other or to anyone with a line of sight to the closed-off space. Entering such closed-off space and seeing only a few or no one present in the closed-off space may appear less vibrant. Such workspace layouts and/or assignments can receive low vibrancy criterion score. Therefore, one example of scoring the vibrancy criterion can be measuring the number of visually observable people at a given area in workspace at a given time. Another example of scoring vibrancy criterion can be based on layouts and/or sitting arrangements of workspace such that a certain number of employees may be visible (or not visible) to each other and to anyone visiting the vicinity. Another example of scoring the vibrancy criterion can be measuring level of noise that may be caused by people at a given area in workspace. Another example of scoring vibrancy criterion can be based on layouts and/or assignments of workspace that can provide open, communal space where employees can be present with other employees (or any other people, such as visitors).

In some embodiments, there can be some trade-offs between the criteria 504. For example, the cost criterion can be inversely related to the overall area of the workspace. In general, larger space requires higher costs such as higher rent, maintenance fees, etc. Therefore, a higher score in the cost criterion can be related to a smaller office space, and a lower score in the cost criterion can be related to a larger office space. On the other hand, the wellness criteria can be represented by the office space's $CO_2$ levels that are directly related to the office space's overall area. Employees can have more space in a larger office area, resulting in lower $CO_2$ levels, which in turn can result in a higher score for the wellness criterion. In contrast, employees can have less space in a smaller office area, resulting in higher $CO_2$ levels, which in turn can result in a lower score for the wellness criterion. Therefore, there can be some trade-offs between the cost and the wellness criteria. For example, a higher wellness score can result in a lower cost score, and vice versa.

In some embodiments, there can be some trade-offs between the cost criterion and the choice criterion. The choice criterion can be represented by the availability of alternative seating/space in the office where employees can work. Therefore, the choice criterion can be impacted by the overall area of the workspace. In some instances, a higher cost score can result in a smaller workspace, which can result in a lower choice score, and vice versa.

In some embodiments, there can be some trade-offs between the wellness criterion and the collaboration criterion. For example, a high wellness score can be represented by low $CO_2$ levels in the office, where employees are placed farther away from each other. In some cases, this can lower the physical interactions between employees and in turn lower the collaboration between the employees. Therefore, in some instances, a higher wellness score can result in a lower collaboration score, and vice versa.

In some embodiments, there can be some trade-offs between the collaboration criterion and the work style criterion. Some organizations can have many employees who are classified as having a "solo" work style. A high work style criterion score for such organizations can be represented by office design's adaptiveness to "solo" oriented work behaviors of the employees, who may not want to physically interact with other employees. An office design with high adaptiveness to "solo" oriented work behaviors, in some instances, can therefore decrease the level of collaboration between the organization's employees. Therefore, in some instances, a higher work style score can result in a lower collaboration score, and vice versa.

In some embodiments, there can be some trade-offs between the wellness criterion and the vibrancy criterion. For example, a high wellness score can be represented by low noise levels in the workspace, but in some embodiments, low noise levels in the workspace can correspond to a low vibrancy criterion score. The vibrancy criterion score can be calculated based on a number of different factors, one of which may include measuring level of noise that may be caused by people at a given area in workspace. Therefore, in some instances, a higher wellness score can result in a lower vibrancy score, and vice versa. In other instances, the vibrancy criterion score can be calculated based on other factors such as the number of visually observable people at a given area in the workspace. For example, if many employees are placed relatively far from each other (which results in relatively low noise level) but are still visually observable at a given area in the workspace, such configuration may result in relatively high vibrancy score. Therefore, in some other instances, low noise level may not necessarily result in low vibrancy score. In addition to the trade-off examples illustrated above, there can be many other trade-offs among the different criteria 504 depending on various instances.

In some embodiments, the design generator 506 can be configured to generate thousands of office design prototypes 510 based on the specified office core/shell 502. In some embodiments, the design generator 506 can be configured to generate anywhere between just one to millions of office design prototypes 510. For example, the design generator 506 can be configured to use the specified office core/shell 502 such as an empty office floorplan as an input and place internal layouts such as internal walls, various rooms, areas, internal doors, furniture, appliances, etc. The design generator 506, for example, can also be configured to assign the intended use of the internal layouts placed in the specified office core/shell 502. For example, the design generator 506 can be configured to assign intended use of the internal layouts such as various rooms, areas, or spaces as office rooms or work areas; as rooms with a specialized purpose (e.g., conference rooms, phone booths, etc.); or as communal, amenity, or social spaces (e.g., library, kitchen, lobby, gym, recreation room, etc.). In another example, the design generator 506 can be configured to assign the intended use by placing individual employees in the internal layouts of the specified office core/shell 502, thereby generating office design prototypes 510. In some embodiments, the design generator 506 can be configured to generate the office design prototypes 510 in a form of office floorplans. The design generator 506, for example, can be configured to generate thousands of different variations of office floorplans with some constraints such as the fixed variables (e.g., outer walls, internal loadbearing structures, stairs, and/or elevators that are difficult to alter) defined in the specified office core/shell 502. In some embodiments, the design generator 506 can be configured to generate the office design prototypes 510 by randomly placing the internal layouts in the specified office core/shell 502 and assign the intended use of those internal layouts. For example, the design generator 506 can create tens of thousands of different randomly generated office design prototypes 510 based on a certain office core/shell 502 (e.g., an empty floorplan). All of these randomly generated office design prototypes 510 can have different internal layouts such as different rooms, communal space, internal walls and doors, furniture, appliances, etc. But, for example, these randomly generated office design prototypes 510, for a given office core/shell 502, can have an identical layout of outer walls, main structural engines, stairs, elevators, and any other fixed variables. In some embodiments, the design generator 506 can be configured to generate the office design prototypes 510 based on a learning process such as a predictive elimination process. For example, the design generator 506 can receive feedback from the analysis/design analyzer 508 regarding less desirable office design layout that's been discarded as illustrated by the discard step 516 as shown in FIG. 5. The design generator 506, based on this learning process, can be configured to avoid generating less desirable office design prototypes 510.

Figure 9:
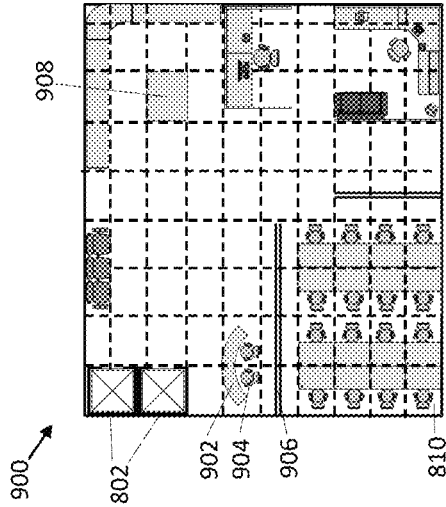
FIG. 9 shows an exemplary office floorplan with internal layouts according to aspects of the disclosed subject matter.

FIG. 6 shows an exemplary architecture of a system according to aspects of the disclosed subject matter. In some embodiments, as illustrated in FIG. 6, the design generator 506 can include sub-engines such as a design engine 602 and/or an assignment engine 604. In some embodiments, the design engine 602 can receive the specified office core/shell 502, for example, an empty office floorplan, as an input, and the design engine 602 can place internal layouts in the specified office core/shell 502. For example, the design engine 602 can place internal walls, rooms and areas, internal doors, furniture, appliances, etc. to an empty office floorplan, which can create an office floorplan with layouts of various rooms and areas with furniture, appliances, etc. (e.g., FIG. 9 shows an exemplary office floorplan with internal layouts. FIG. 9 is described in more detail below). In some embodiments, the design engine 602 can create many different office floorplans with many different internal layouts for the specified office core/shell 502, but all of these different office floorplans for the specified office core/shell 502 can have an identical layout of outer walls, main structural engines, stairs, elevators, and any other fixed variables. In some embodiments, the design engine 602 can randomly place the internal layouts in the specified office core/shell 502. In some embodiments, the design engine 602 can place the internal layouts in the specified office core/shell 502 based on a learning process such as a predictive elimination process.

In some embodiments, once the design engine 602 places the internal layouts in the specified office core/shell 502, the assignment engine 604 can assign the role/intended use of those internal layouts such as office rooms and areas to generate the office design prototypes 510. For example, the assignment engine 604 can assign intended use of the office rooms and areas such as use by certain department(s), by certain individual(s), and/or for special purposes (e.g., conference rooms, phone booths, etc.). In another example, the assignment engine 604 can assign the intended use of rooms and areas as certain communal, amenity, or social spaces (e.g., library, kitchen, lobby, gym, recreation room, etc.). In another example, the assignment engine 604 can assign internal layouts such as seats, workstations, and/or offices to individual employees. FIG. 10 shows an exemplary intended use of the internal layouts that the assignment engine 604 can assign as described above (FIG. 10 is described in more detail below). In some embodiments, the assignment engine 604 can create many different sets of the office design prototypes 510, where one set of the office design prototypes 510 may include many office design prototypes 510 with the same internal layouts (e.g., as designed by the design engine 602), but with different assignments of the internal layouts (e.g., as assigned by the assignment engine 604). In some embodiments, the design assignment engine 604 can randomly assign the role/intended use of the internal layouts (e.g., as designed by the design engine 602) to generate the office design prototypes 510. In some embodiments, the design assignment engine 604 can assign the role/intended use of the internal layouts to generate the office design prototypes 510 based on a learning process such as a predictive elimination process. Therefore, the design generator 506, for example, can use the design engine 602 to fill the internal layouts of the specified office core/shell 502, and use the assignment engine 604 to assign the role/intended use of the internal layouts in the specified office core/shell 502 to generate many different office design prototypes 510.

In some embodiments, rather than receiving an office core/shell 502 as an input, the design generator 506 can be configured to receive an input of an office floorplan with internal layouts and/or intended use of the internal layouts. For example, an organization can make little or no changes to the internal layouts of an existing office workspace design (e.g., the design can reflect the organization's current workspace, or an existing workspace where the organization can move-in), and may redesign an existing office workspace by reassigning the role and/or intended use of pre-existing internal layouts such as office rooms and spaces (e.g., using the assignment engine 604) to generate the office design prototypes 510. For example, the assignment engine 604 can receive, as an input, a floorplan of an existing office workspace design, or any floorplan of office workspace (e.g., that may or may not exist in real life) including the internal layouts, and the assignment engine 604 can assign the role and/or intended use of those internal layouts as described herein. For example, the assignment engine 604 can reassign the intended role/use of the office rooms and spaces such as use by certain department(s), by certain individual(s), and/or for special purposes (e.g., conference rooms, phone booths, etc.) in the existing office design (e.g., a private office that was assigned to an individual employee may be reassigned as a conference room, phone booth, recreation room, etc. and vice versa; employees may be reassigned to different desks, workstations, or offices; departments may be reassigned to different areas/rooms of the office, etc.). In another example, the assignment engine 604 can reassign the intended use of spaces as certain communal, amenity, or social spaces (e.g., library, kitchen, lobby, gym, recreation room, etc.). For example, a library area may be reassigned as a kitchen, lobby, gym, recreation room, or work area (e.g., individuals may be assigned to desks/workstations to reassign the library area as work area). In another example, the assignment engine 604 can reassign seats, desks, workstations, and/or offices for employees or for certain departments. The assignment engine 604 can, therefore, generate many different office design prototypes 510 with the same internal layout of the existing office, but with different role and/or intended use of that internal layout.

In some embodiments, the design analyzer 508 can be configured to perform a scoring process 512 of each office design prototype 510 according to the outputs of the discover system 100 and the criteria 504 as described herein. For example, the design analyzer 508 can be configured to perform a scoring process 512 for a certain office design prototype 510 by correlating an output of the discover system 100 (e.g., a target network model) with the office design prototype 100. As described in more detail below, the scoring process 512, for example, can be performed based on various analyses/calculations such as a simulation, a heuristic model, an agent-based simulation, and/or any other scoring analyses/calculations (e.g., based on the output of the discover system 100 such as a target network model) against a certain office design prototype 510.

A simulation, for example, can be used to simulate a certain office design prototype 510's exposure to sunlight during the day. Such sunlight exposure simulation can be used to score the wellness criterion. For example, if a simulation indicates that almost all of the employees, as allocated in a certain office design prototype 510, can be exposed to certain hours of sunlight exposure during a sunny day, then the scoring process 512 can give a high score. In contrast, for example, if a simulation indicates that almost all of the employees, as placed in a certain office design prototype 510, are exposed to almost no sunlight even in a sunny day, then scoring process 512 can give a low score. A simulation, for example, can also be used to simulate employees' access to windows in a certain office design prototype 510. In some embodiments, a simulation can also be used to simulate how many employees would be visible (or not visible) to each other as they are allocated in a certain office design prototype 510. For example, a simulation can be used to simulate the number of visually observable employees at a given area, for example, as the employees are assigned in a certain office design prototype 510 with specific internal layouts. A specific office design prototype 510, for example, can have assigned seating that places many employees to work close to each other. If, however, the internal layouts in that area include many non-transparent walls to prevent many of the employees in their assigned seating from seeing each other, a simulation could simulate this, and the scoring process 512 can return a low score for the vibrancy criterion. In another example, if a certain office design prototype 510's internal layouts allow many of the employees in their assigned seating to see each other, a simulation could also simulate this, and the scoring process 512 can return a high score for the vibrancy criterion.

A heuristic model, for example, can be used to score the cost criterion based on the overall area and layout of a certain office design prototype 510. A heuristic model, for example, can also be used to calculate the $CO_2$ and noise levels of a certain office design prototype 510, which in turn can be used to score the wellness criterion and/or the vibrancy criterion. For example, the $CO_2$ and noise levels can be calculated based on the number of people in a certain office space within a certain area in a certain office design prototype 510. For example, if a high number of employees are placed close to each other in a certain office design prototype 510, the scoring process 512 can give a low score for the wellness criterion, and/or a high score for the vibrancy criterion. In contrast, for example, if employees are generally allocated farther apart from each other in a certain office design prototype 510, the scoring process 512 can give a high score for the wellness criterion and/or a low score for the vibrancy criterion. A heuristic model, for example, can also be used to score the choice criterion. For example, the choice criterion score can be calculated based on an alternative seating/space for the employees in a certain office design prototype 510. A heuristic model, for example, can also be used to score the privacy criterion. For example, the privacy criterion score can be calculated based on a number of secluded places such as private conference rooms and phone booths in a certain office design prototype 510. If there are enough secluded places for the employees to address their private matters (e.g., call with a doctor), then the scoring process 512 can give a high score for privacy criterion.

An agent-based simulation, for example, can simulate a sequence of actions such as how employees interact with each other using an agent-based model. For example, every agent, which represents an employee of an organization, is given a set of rules according to which it interacts with other agents, and this interaction can generate the overall system of behaviors within a certain office design prototype 510. For example, a highly-connected employee, a cross-department influencer, a "solo" work style employee, a "collaboration" work style employee, a CEO, and/or an employee in a certain department as determined by the discover system 100 can behave differently and therefore can be represented as agents with different set of interaction rules. Such agent-based simulation, for example, can be used to score the collaboration criterion of a certain office design prototype 510. For example, if the agents as modeled by the simulation interact frequently with other agents in a certain office design prototype 510, then the scoring process 512 can give a high score. In contrast, for example, if the agents as modeled by the simulation do not interact well with other agents in a certain office design prototype 510, then the scoring process 512 can give a low score. In some embodiments, an agent-based simulation can be used to score the vibrancy criterion of a certain office design prototype 510. For example, if agents as modeled by the simulation often gather in an open space (e.g., communal area such as a lobby) for a certain office design prototype 510, the scoring process 512 can calculate the number of visually observable agents (people) gathering at such area, and length and frequency of such gathering as a factor to calculate the vibrancy criterion.

In some embodiments, the scoring process 512, can be performed based on various analyses/calculations as described above along with the data output (e.g., a target network model) from the discover system 100. As explained above, for example, the agent-based simulation can incorporate each agent's behavioral model based on the data output of the discover system 100. In another example, the data output from the discover system 100 can be used to score the work style criterion of a certain office design prototype 510. The discover system 100 can be configured to determine and classify each employee's work style, and such determination, for example, can be compared against a certain office design prototype 510's overall adaptiveness to different work behaviors of the employees.

The design analyzer 508 can be configured to perform a comparison process 514 between the scored office design prototype and the target prototypes. For example, the design analyzer 508 can be configured to use a genetic algorithm to perform the comparison process 514 between the scored office design prototype and the target prototypes. The target prototypes, for example, can be based on the organization's data collected by the discover system 100. The target prototypes, for example, can include an office design prototype with a high sum or average of all of the criteria score. The target prototypes, for example, can also include an office design prototype with a high score for one of the criteria 504. If the comparison process 514 between the office design prototype 510 and the target prototype results in a negative correlation, then such comparison result is discarded as indicated by the discard step 516 in FIG. 5. For example, if the office design prototype 510's criteria scores (e.g., one of the criteria scores, and/or sum of all of the criteria scores, etc.) are sufficiently lower than the criteria scores of the target prototype, then such office design prototype 510 can be discarded. The comparison process 514 can continue, and if there is a better match, the design system can then score against the better target prototypes; and it can be run again, creating better matches, until a small set of design prototypes 518 are discovered which have the target matches with the selected criteria 504. For example, if the office design prototype 510's criteria scores (e.g., one of the criteria scores, and/or sum of all of the criteria scores, etc.) are higher than the criteria scores of the target prototypes, then such office design prototype 510 can be kept. In some embodiments, the office design prototype 510 with better criteria scores (e.g., one of the criteria scores, and/or sum of all of the criteria scores, etc.) than the criteria scores of the target prototypes can update/replace one of the pre-existing target prototypes. After performing the comparison process 514, the design analyzer 508 can output a few optimized office design prototypes 518, for example, with a target arrangement of the employees, a target layout of the rooms (e.g., office rooms, conference rooms, etc.), a target layout of communal space (e.g., kitchen, library, lobby, gym, etc.), and/or a target layout of overall workspace.

The term "optimized" in the optimized office design prototypes 518 does not necessarily mean the absolute best set of criteria scores. Instead, for example, the term "optimized" in the optimized office design prototypes 518 can correspond to better criteria scores (e.g., one of the criteria scores, and/or the sum of all of the criteria scores, etc.) than the criteria scores of some of office design prototypes 510 that were generated by the design generator 506. In some embodiments, performing more iterations of the comparison process 514 with a greater number of office design prototypes 510 (generated by the design generator 506) can result in comparison of a greater number of office design prototypes 510 which can allow the design analyzer 508 to output optimized office design prototypes 518 with potentially even better criteria scores.

In some other embodiments, a result of the performing several iterations of the comparison process 514 can be a small set of optimized design prototypes 518 with high scores for each selected criterion for architects or members of organization to be able to make the best decisions to meet the organizational goals. The organizational goals, for example, can be based on the organization's culture, business goals, nature of business, or based on the opinions of the organization's employees. The optimization of the workspace from the final set of optimized design prototypes 518 based on the organization's goals can create environments conducive for effective organizational culture.

In some embodiments, the design system 500 can include a user interface. A user interface, for example, can provide an output on a display device (e.g., a monitor, a projector, etc.) to present specified office core/shell 502, criteria 504, criteria scores from the scoring process 512, office design prototypes 510, discarded office prototypes from the discard step 516, target prototypes, final prototypes 518, or any input/output of the design system. A user interface, for example, can present final design prototypes 518 and the associated criteria scores on a display device to a user (e.g., a member of the organization designing its office floor plan, an architect, or anyone using the user interface). A user interface can also display the associated criteria scores in a chart form as illustrated in FIGS. 11-13 and 15-17 or in any other form. A user interface can also display a comparison of criteria scores, for example, in a chart form as illustrated in FIGS. 14 and 18, and allow the user to select an optimized office floor plan from the final design prototypes 518. In another example, a user interface can indicate (e.g., on a display device) a creation status of the design generator 506, an optimization status of the design analyzer 508, and/or a status of any component or engine in the design system 500. In another example, a user interface can allow the user to select target prototypes for the comparison process 514. In another example, a user interface can be configured to receive one or more inputs from a user to control the design generator 506, design analyzer 508, and/or any component or engine in the design system 500. In some embodiments, a user interface can be a part of the discover system 100, the design generator 506, the design analyzer 508, the modeling engine 112, or any component of the design system 500. In some other embodiments, a user interface can be a separate component in the design system 500.

In some embodiments, the design system 500 can include one or more processors and memory. The memory can have a software application stored in its memory (e.g., executable instructions), for example, for the discover system 100, the design generator 506, and/or the design analyzer 508, a user interface, etc. The processor can run the software application stored in the memory to conduct data analysis. In some embodiments, the processor and the memory can be a part of the discover system 100, the design generator 506, and/or the design analyzer 508.

Figure 7:
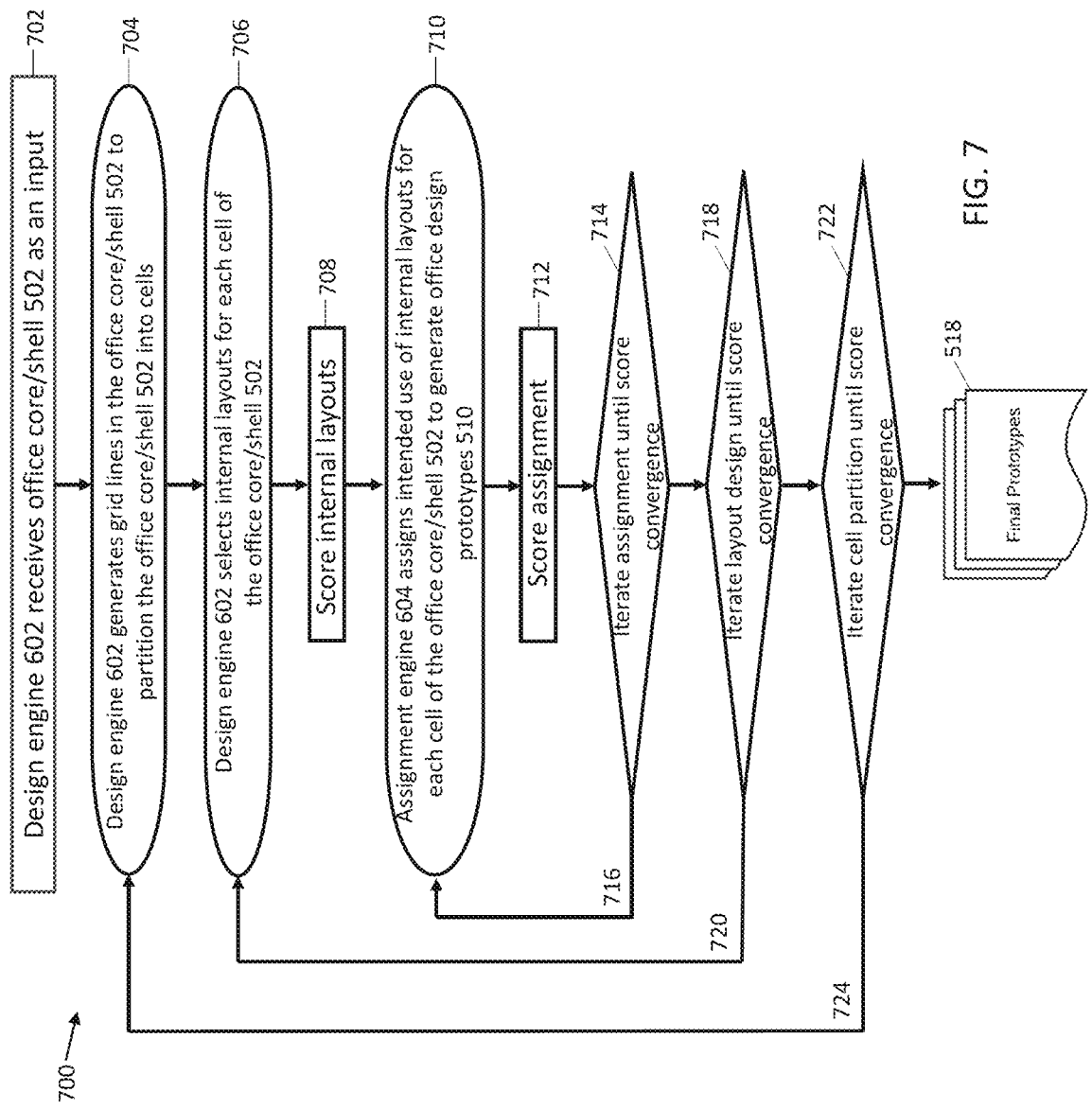
FIG. 7 shows an exemplary process for generating optimized office design prototypes according to aspects of the disclosed subject matter.

FIG. 7 shows an exemplary process for generating office design prototypes according to aspects of the disclosed subject matter. In some embodiments, the design generator 506 of FIGS. 5 and 6 can include a design engine 602 and an assignment engine 604.

As described in more detail below, the design engine 602 can be configured to: (1) receive an office core/shell 502, such as an empty floorplan; (2) partition the office core/shell 502 using grid lines to generate "cells"; (3) generate an internal layout for the office core/shell 502 by associating each cell with objects, such as internal wall, door, furniture, desk, table, appliances, and cabinets; and (4) determine a score for the generated internal layout, for example, in accordance with predetermined criteria as described in connection with FIGS. 5 and 6 (e.g., the design analyzer 508 can be configured to score the generated internal layout by performing the scoring process). The assignment engine 604 can be configured to: (1) assign, to each cell in the internal layout, a designated use to generate office design prototypes 510; and (2) determine a score for the generated office design prototypes 510, for example, in accordance with predetermined criteria as described in connection with FIGS. 5 and 6 (e.g., the design analyzer 508 can be configured to score the assignment of designated use by performing the scoring process). In some embodiments, the design engine 602 and the assignment engine 604 can be configured to iterate one or more of the steps 702-712 to generate the final office design prototypes 518 (e.g., as identified in steps 714-724).

In some embodiments, rather than starting the process of FIG. 7 with an office core/shell 502, such as an empty floorplan, the process can start with an office workspace floorplan with internal layouts and/or intended use of the internal layouts. For example, the office workspace floorplan can reflect the internal layouts of the organization's current workspace, existing office workspace where the organization can move-in, or the floorplan can reflect the internal layouts that may or may not exist in real life. In such cases, for example, the design engine 602 can be configured to (1) receive an office floorplan (e.g., with internal layouts and/or intended use of the internal layouts) as an input; (2) partition the floorplan with internal layouts using grid lines to generate "cells"; (3) adopt the pre-existing internal layouts of the office workspace floorplan by making little or no changes to the pre-existing internal layouts (e.g., the design engine 602 can skip the step 706); and (4) determine a score for the adopted internal layouts, for example, in accordance with predetermined criteria as described in connection with FIGS. 5 and 6. In some embodiments, the design engine 602 can be configured to perform altered step 706 by replacing a predetermined percentage of the pre-existing internal layouts. For example, the design engine 602 can be configured to replace anywhere from zero to hundred percent of the pre-existing internal layouts under step 706. In some embodiments, the design engine 602 can be configured to map the existing grid lines of the received office floorplan (e.g., if available) or set predetermined/preselected grid lines, and skip the step 704. The process of FIG. 7 can continue with the received office floorplan, where the assignment engine 604 can be configured to: (1) reassign the designated use of the received office floorplan's internal layout for each cells to generate office design prototypes 510; and (2) determine a score for the generated office design prototypes 510, for example, in accordance with predetermined criteria as described in connection with FIGS. 5 and 6.

In step 702, the design engine 602 can be configured to receive an office core/shell 502 as an input. For example, as described above, an office core/shell 502 can be an empty floorplan of an organization's current workspace or one of an organization's future workspace where the organization can move-in. A specified office core/shell 502 can represent any physical core/shell of an empty office with fixed variables, such as outer walls, internal loadbearing structures, stairs, fixtures, and/or elevators that are difficult to alter.

In step 704, the design engine 602 can generate grid lines in the office core/shell 502 to partition the office core/shell 502 into cells or units. In some embodiments, the design engine 602 can generate grid lines to partition the office core/shell 502 into cells or units with predetermined shapes, including, for example, triangles, rectangles, and polygons. In some embodiments, the design engine 602 can generate grid lines to partition the office core/shell 502 into cells or units with uniform/similar sizes. In other embodiments, the design engine 602 can generate grid lines to partition the office core/shell 502 into cells or units, some of which have different sizes from other cells or units. In some embodiments, the design engine 602 can be configured to generate different numbers of grid lines to partition the office core/shell 502 into cells with different sizes (e.g., more grid lines can partition the office core/shell 502 into smaller cells, less grid lines can partition the office core/shell 502 into larger cells). In some embodiments, the design engine 602 can be configured to change the size of the cells by adding, removing, and/or moving the grid lines.

Figure 8:
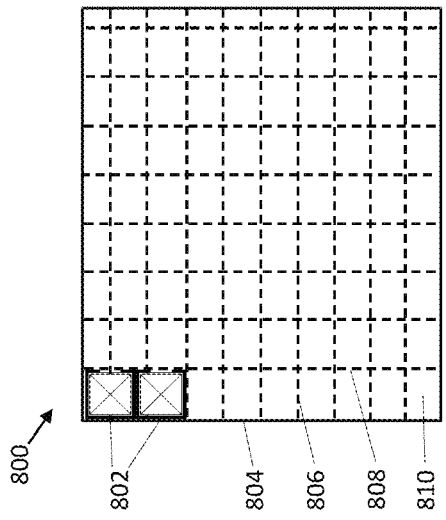
FIG. 8 shows an exemplary empty floorplan with grid lines according to aspects of the disclosed subject matter.

FIG. 8 shows an exemplary office core/shell 502 with grid lines according to aspects of the disclosed subject matter. For example, FIG. 8 shows an empty floorplan 800 with fixed variables such as elevators 802 and outer wall 804, which can be difficult to alter. FIG. 8 also shows several horizontal grid lines such as a dotted horizontal line 806 as well as several vertical grid lines such as a dotted vertical line 808. These grid lines partition the empty floorplan 800 into a plurality of cells or units such as 810. For example, in step 702 of FIG. 7, the design engine 602 can be configured to receive the empty floorplan 800, and in step 704, the design engine 602 can generate grid lines such as lines 806 and 808 to partition the empty floorplan 800 into many cells such as cell 810.

Returning to FIG. 7, in step 706, the design engine 602 can be configured to select one or more internal layouts for each of the cells. For example, as described above, internal layouts can be internal walls, doors, furniture, appliances, etc. In some embodiments, the design engine 602 may not select any internal layouts for a cell. For example, the design engine 602 may be configured to follow instructions not to select any internal layouts in cells where a fixed variables such as outer wall or elevators are placed. In another example, the design engine 602 may be configured to follow instructions not to place any internal layouts in cells with outside windows (e.g., to allow more sun light to enter the workspace, and/or to avoid blocking the outside view). In another example, the design engine 602 may be configured to follow instructions not to place certain internal layouts (e.g., internal layouts that can block people's pathways) in certain cells to provide space for circulation of people. In some embodiments, the design engine 602 may be configured to follow instructions for a particular cell to select or prefer particular internal layout(s) for that cell. For example, the design engine 602 may be configured to follow instructions to select or prefer corner desks for a corner cell (e.g., cell 810 in FIG. 8).

FIG. 9 shows an exemplary office floorplan 900 with internal layouts according to aspects of the disclosed subject matter. FIG. 9 shows, for example, internal layouts such as an arc-shaped desk 902, a chair 904, an internal wall 906, a rectangular table/desk 908, etc. FIG. 9 also shows, for example, a desk and a chair as the selected internal layouts (e.g., by the design engine 602 in step 706) for cell 810.

Returning to FIG. 7, in step 708, the design engine 602 can be configured to determine the score for the selected one or more internal layouts for the cells. For example, the internal layouts can be scored in accordance with predetermined criteria 504 as described in connection with FIGS. 5 and 6 (e.g., using the scoring process 512). In some embodiments, the internal layouts scoring can involve scoring all of the predetermined criteria 504 or parts of the predetermined criteria 504. For example, the internal layouts scoring can involve scoring parts of the predetermined criteria 504 that are related to the internal layouts. For example, the cost criterion can be scored based on the internal layouts of the cells (e.g., the assigned use of the internal layouts of the cells, in most cases, have minimal impact on the cost of configuring the workspace based on the internal layouts). The cost criterion, for example, can be calculated based on the sum of the cost of configuring all of the internal layouts (e.g., cost of configuring internal walls, doors, furniture, appliances, etc.). In another example, the choice criterion can be scored based on the internal layouts of the cells. The choice criterion score, for example, can measure the number of alternative seating in the workspace (e.g., a number of free-floating seats in a library, coffee table, lobby, outdoor space seating that is a part of the workspace). For example, the internal layouts can be analyzed to provide the total number of seating in the workspace, which can be compared with the total number of employees to score the choice criterion (e.g., any number of seating in the workspace that is greater than the total number of the employee can be the number of alternative seating in the workspace).

In step 708, in some embodiments, the design engine 602 can be configured to determine the score for the cells without internal layouts (or with internal layouts that do not block people's pathways), such as cells with fixed structure (e.g., outer wall, elevator, stair case, etc.) or cells with empty layouts or internal layouts that do not block people's pathways, for example, to be used as a path for circulation of people. For example, the design engine 602 can be configured to score the mobility of people in certain internal layouts (or empty layouts, or layouts that do not block people's pathways). For example, if the internal layout configuration provides enough pathways for people to move and reach all accessible locations of the office, then the mobility score can be high. In another example, if the internal layout configuration does not provide enough pathways for people to move around the office and reach accessible locations of the office, then the mobility score can be low.

In step 710, the assignment engine 604 can be configured to assign a use/role of the one or more internal layouts selected for each of the cells. For example, as described above, assigned use can include use by certain department(s), by certain individual(s), for special purposes (e.g., conference rooms, phone booths, etc.) and/or as a pathway for circulation of people. In another example, the assignment engine 604 can be configured to assign the use of spaces or internal layouts as certain communal space (e.g., library, kitchen, lobby, gym, recreation room, etc.). In another example, the assignment engine 604 can be configured to assign seats, workstations, and/or offices for individual employees or for department(s). In some embodiments, the assignment engine 604 can be configured to assign a use/role of the cells with or without an internal layout.

In some embodiments, the assignment engine 604 can be configured to follow instructions not to assign any use for a particular cell. For example, the assignment engine 604 can be configured to follow instructions not to assign any use for a cell with fixed variables (e.g., elevators 802) or with internal walls (e.g., internal wall 906). In some embodiments, the output of the assignment engine 604 (e.g., a floorplan with internal layouts and use of the internal layouts) can be provided as an input (e.g., office design prototypes 510) to the analysis/design analyzer 508.

Figure 10:
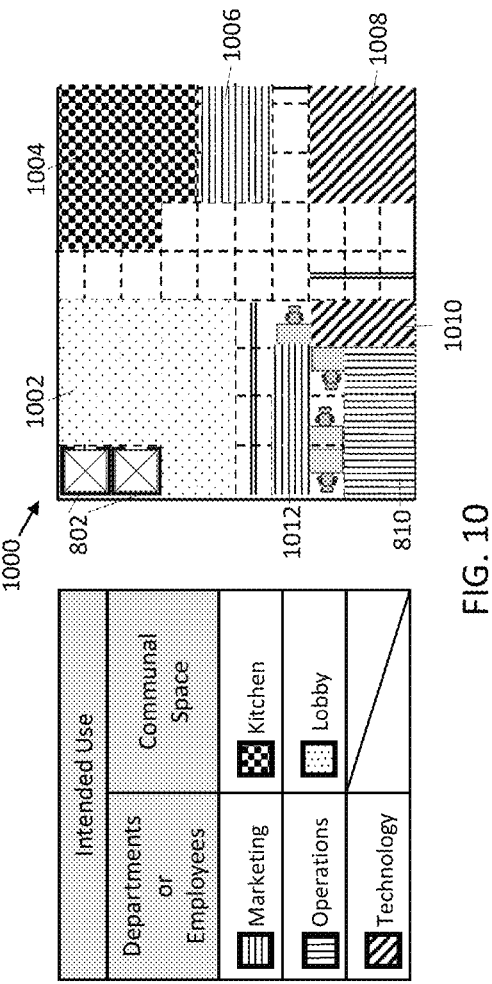
FIG. 10 shows an exemplary office floorplan with internal layouts and the associated use/role of the layouts according to aspects of the disclosed subject matter.

FIG. 10 shows an exemplary office floorplan 1000 with internal layouts and the assigned use/role of the internal layouts according to aspects of the disclosed subject matter. For example, FIG. 10 shows that the cells 1002 (e.g., dotted pattern filled cells that are near the elevators 802) have been assigned to be used as a lobby. FIG. 10 also shows that the cells 1004 (e.g., checkerboard pattern filled cells) have been assigned to be used as a kitchen. The cells 1006 and 1012 (e.g., horizontal line filled cells) have been assigned to be used by the marketing department or individual marketing department employees (e.g., for each cell in 1006 and 1012). The cells 1008 and 1010 (e.g., diagonal line filled cells) have been assigned to be used for the technology department or individual technology department employees (e.g., for each cell in 1008 and 1010). The cell 810 and other surrounding cells (e.g., vertical line filled cells) have been assigned to be used by the operations department or individual operations department employees (e.g., for the cell in 810 and other surrounding cells that are vertical line filled). For example, the assignment engine 604 (e.g., in step 710) can be configured to assign the use of the internal layouts in cell 810 (e.g., a desk and a chair, shown in cell 810 in FIG. 9) for operations department or for an individual operations department employee.

Returning to FIG. 7, in step 712, the assignment engine 604 can be configured to determine the score for the assigned use. For example, the assigned use can be scored in accordance with predetermined criteria 504 as described in connection with FIGS. 5 and 6 (e.g., using the scoring process 512). In some embodiments, the assigned use scoring can involve scoring all of the predetermined criteria 504 or parts of the predetermined criteria 504. For example, the assigned use scoring can involve scoring parts of the predetermine criteria 504 that are related to the assigned use. In some embodiments, the privacy score can be scored based on the assigned use of the internal layouts/cells that have been assigned to provide physical privacy to employees (e.g., a number of internal layouts/cells that are assigned as private office, conference rooms, phone booths, etc.). In some embodiments, the work style criterion can be scored based on the assigned use of the internal layouts/cells by analyzing an overall adaptiveness to different work behaviors of the employees in the organization as determined by the discover system 100. In some embodiments, an assignment of individual employees with certain work style in certain internal layouts/cells can be analyzed. An employee with a "solo" work style, for example, may prefer to be placed at a quiet area far away from any communal, amenity, or social spaces, and the assignment of the solo work style employees in a quiet area far from the communal amenity, or social spaces can be analyzed to have high work style criterion score.

In some embodiments, the mobility score can be calculated in step 712 as part of the assigned use score. For example, certain cells can be assigned as communal, amenity, or social spaces (such as kitchen, library, gym, lobby, recreation room, etc.) with a high level of circulation. In such communal, amenity, or social spaces with a high level of circulation, wider pathways may be desirable to allow higher number of people to freely move around the area. Therefore, in some embodiments, wider pathways that can accommodate a high level of circulation to move freely in high traffic area can result in high mobility score. In another example, certain cells can be assigned as a private office that is far away from any high traffic area, and such cells may have low traffic. In such low traffic space, wider pathways may be less desirable, and can result in a low score (e.g., inefficient use of space can result in lower score for mobility or other predetermined criteria score 504).

In some embodiments, the design system 500 can iterate steps 710-712 to improve the use assignments to the cells or internal layouts for the cells. Specifically, the assignment engine 604 in the design system 500 can iteratively modify the assigned uses and score the assigned uses, until the score satisfies a predetermined condition. In some embodiments, the design system 500 can be configured to iterate over a predetermined set of use templates and pick the use template with the highest score.

In other embodiments, the design system 500 can be configured to use an optimization technique, such as a genetic algorithm, to generate new use assignments to cells until a predetermined condition is met. For example, the design system 500 can be configured to determine whether the use of the cells, generated by an optimization technique, have converged by analyzing the score over a predetermined number of iterations of steps 710-712. If the use scores from the predetermined number of iterations converges (e.g., does not vary by more than a threshold $\varepsilon_1$), then the design system 500 can proceed to step 718. If the use scores from the predetermined number of iterations do not converge (e.g., vary by more than a threshold $\varepsilon_1$), then the process can return to step 710 (as indicated by arrow 716) to repeat the steps 710-712 until convergence.

In some embodiments, the design system 500 can iterate steps 706-714 to improve the internal layout and use assignments to cells. Specifically, the design engine 602 in the design system 500 can iteratively modify the internal layout selected for one or more cells and score the internal layout, and assignment engine 604 in the design system 500 can iteratively modify the assigned uses and score the assigned uses, until the internal layout score satisfies a predetermined condition (checked in step 718). In some embodiments, the design system 500 can be configured to iterate over a predetermined set of internal layout templates and pick the internal layout template with the highest score.

In other embodiments, the design system 500 can be configured to use an optimization technique, such as a genetic algorithm, to generate a new internal layout selection for one more cells until a predetermined condition is met. For example, the design system 500 can be configured to determine whether the internal layouts of the cells, generated by an optimization technique, have converged by analyzing the internal layout scores over a predetermined number of iterations of steps 706-714. If the internal layout scores from the predetermined number of iterations converges (e.g., does not vary by more than a threshold $\varepsilon_2$), then the design system 500 can proceed to step 722. If the internal layout scores from the predetermined number of iterations do not converge (e.g., vary by more than a threshold $\varepsilon_2$), then the process can return to step 706 (as indicated by arrow 720) to repeat the steps 706-714 until convergence.

In some embodiments, the design system 500 can iterate steps 704-718 to improve the cell partitions, the internal layouts, and the use assignments to cells. Specifically, the design engine 602 in the design system 500 can iteratively modify the cell partitions for one or more cells and score the cell partitions, until the cell partition score satisfies a predetermined condition (checked in step 722). For example, the design engine 602 can be configured to change the size of the cells by adding, removing, and/or moving the grid lines. In another example, the design engine 602 can be configured to re-generate different numbers of grid lines to partition the office core/shell 502 into cells with different sizes (e.g., more grid lines can partition the office core/shell 502 into smaller cells, less grid lines can partition the office core/shell 502 into larger cells). In some embodiments, when the cells are small (e.g., the office core/shell 502 is partitioned into higher number of cells), the design system 500 may result in cell partition scores that do not satisfy the predetermined condition (checked in step 722). For example, when the cells are small, the iterations of the cell partition scores may converge to lower scores (e.g., the scores may converge to local minima, and/or the scores may not converge). In another example, when the cells are small, a greater computing power may be required to compute, e.g., internal layouts and assigned use for higher number of cells and iterations of the steps 704-718 may take longer, and in some cases, the scores may not optimize properly. In some embodiments, when the cells are large (e.g., the office core/shell 502 is partitioned into lower number of cells), the design system 500 may also result in cell partition scores that do not satisfy the predetermined condition (checked in step 722). When the cells are large, for example, less computing power may be needed because there are smaller number of cells for computation, and the iterations of the steps 704-718 may run quickly, but the resulting iterations may not return desirable office plan. For example, if the office core/shell 502 is partitioned into four cells (or just one cell in another example), the iterations of placing internal layouts and assigning use of these four cells (or just one cell) can be performed quickly, but the resulting scores may be low because it may not have enough cells to place the desirable combinations of internal layouts and assigned use to satisfy a predetermined criteria 504 (e.g., may not return high criteria scores). Therefore, in some embodiments, the design engine 602 can iteratively modify the size of cell partitions for one or more cells and score the cell partitions, until the cell partitions reach a desirable size that can satisfy a predetermined condition (checked in step 722). In some embodiments, the design system 500 can be configured to iterate over a predetermined set of cell partition templates and pick the cell partition template with the highest score. In some embodiments, the size of the cell partitions can be modified to improve the resulting office design prototypes. In some cases, if the design system 500 runs one or more steps of FIG. 7 with too small and/or too big sized grid cells, the design system 500 can output office design prototypes with good scores, but still undesirable because the resulting prototypes may be over-fitted and may not be convenient to members of the organization.

In other embodiments, the design system 500 can be configured to use an optimization technique, such as a genetic algorithm, to generate new cell partitions until a predetermined condition is met. For example, the design system 500 can be configured to determine whether the cell partitions, generated by an optimization technique, have converged by analyzing the cell partition scores over a predetermined number of iterations of steps 704-718. If the cell partition scores from the predetermined number of iterations converges (e.g., does not vary by more than a threshold $\varepsilon_3$), then the design system 500 can proceed to output the office design prototypes 510 with the converged scores as the optimized office design prototypes 518. If the cell partition scores from the predetermined number of iterations do not converge (e.g., vary by more than a threshold $\varepsilon_3$), then the process can return to step 704 (as indicated by arrow 724) to repeat the steps 704-718 until convergence. In some embodiments, if the iterations of one or more steps 704-724 do not converge after a predetermined number of iterations (e.g., if the scores do not converge after high number of iterations), the design system 500 can be configured to modify the size of cell partitions, re-configure the internal layouts, and/or re-configure the assigned use; and re-run the iterations until convergence or until a predetermined number of iterations run without convergence. In some embodiments, if the iterations of one or more steps 704-724 do not converge after a predetermined number of iterations, the design system 500 can be configured to notify such non-convergence to a user, for example, via user interface.

Figure 11:
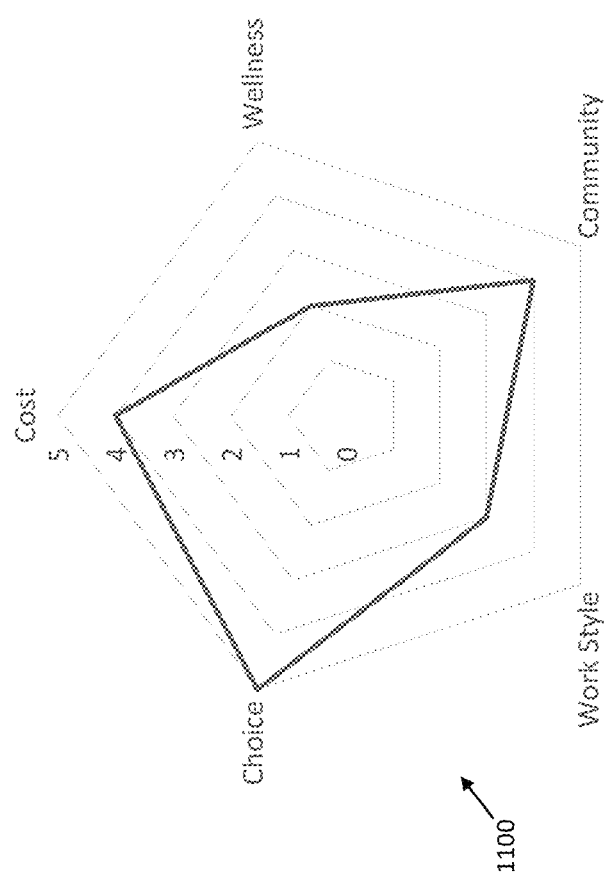
FIGS. 11-13 show five exemplary criteria scores for an exemplary optimized office design prototype according to aspects of the disclosed subject matter.
Figure 12:
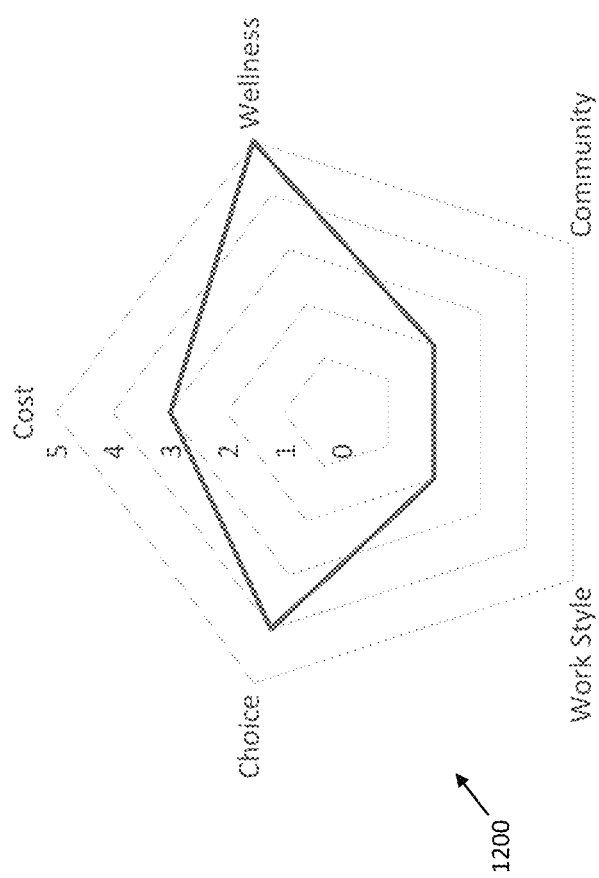
Figure 13:
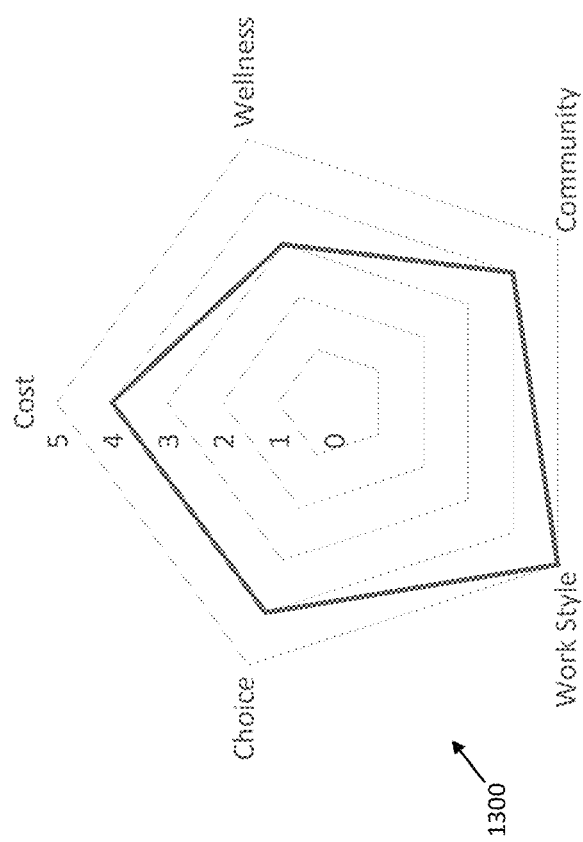
Figure 14:
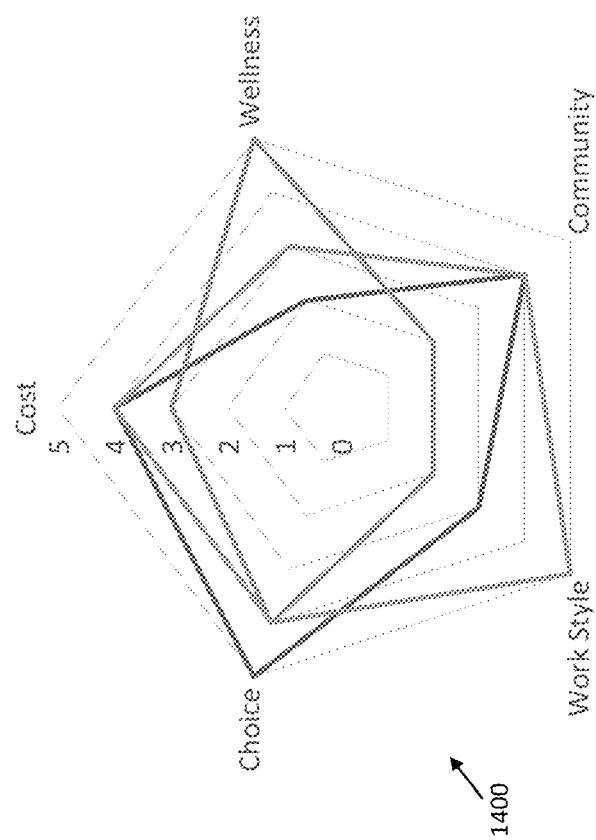
FIG. 14 shows a comparison of five exemplary criteria scores for an exemplary set of optimized office design prototypes as illustrated in FIGS. 11-13 according to aspects of the disclosed subject matter.

FIGS. 11-13 illustrate radar charts of five criteria scores of an exemplary set of optimized design prototypes 518. For example, as illustrated in FIGS. 11-13, an organization may select the following five criteria 504: cost, wellness, community, work style, and choice to automatically generate data-driven optimized office design prototypes 518. The five criteria scores for each optimized design prototype 518 are shown below in Table 1:

TABLE 1

| Criteria | Design 1 (FIG. 11) | Design 2 (FIG. 12) | Design 3 (FIG. 13) |
|---|---|---|---|
| Cost | 4 | 3 | 4 |
| Wellness | 2 | 5 | 3 |
| Community | 4 | 2 | 4 |
| Work Style | 3 | 2 | 5 |
| Choice | 5 | 4 | 4 |

Figure 15:
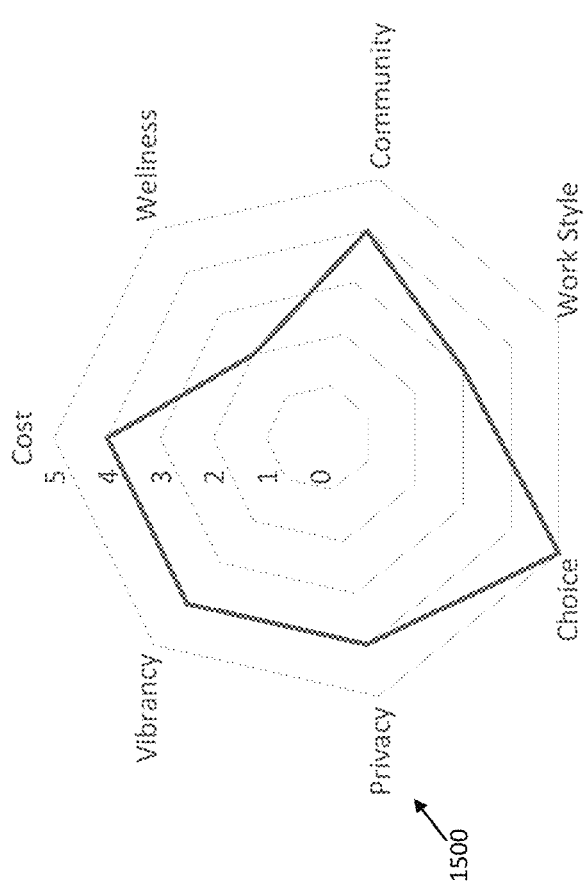
FIGS. 15-17 show seven exemplary criteria scores for an exemplary optimized office design prototype according to aspects of the disclosed subject matter.
Figure 16:
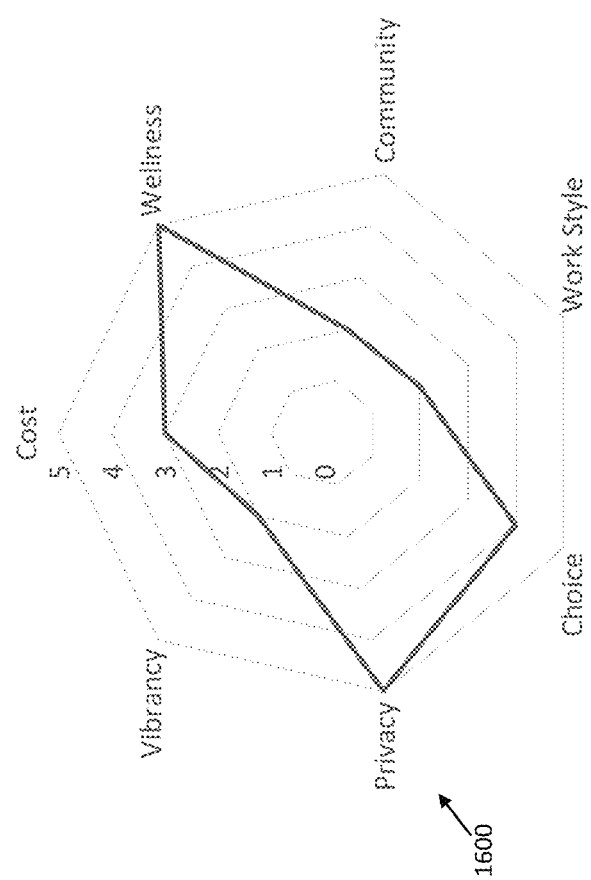
Figure 17:
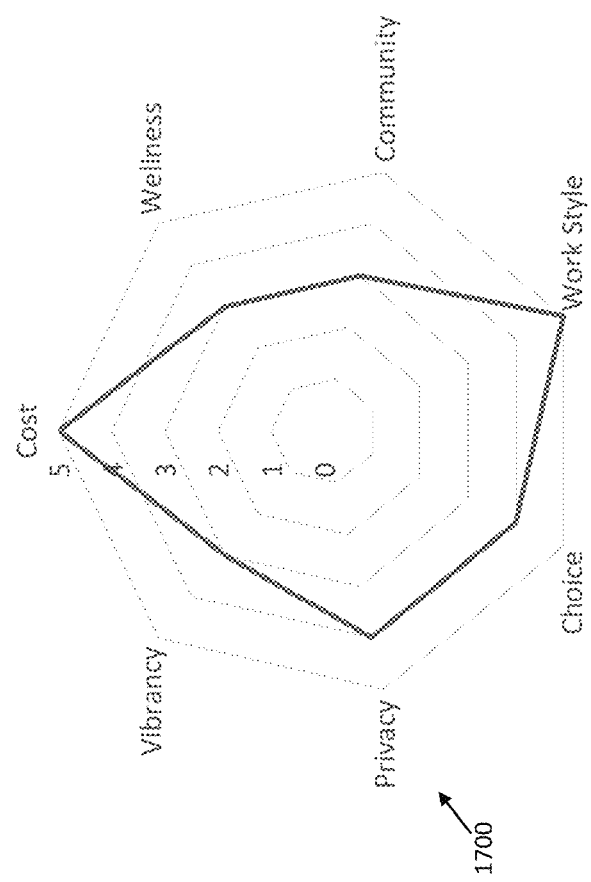
Figure 18:
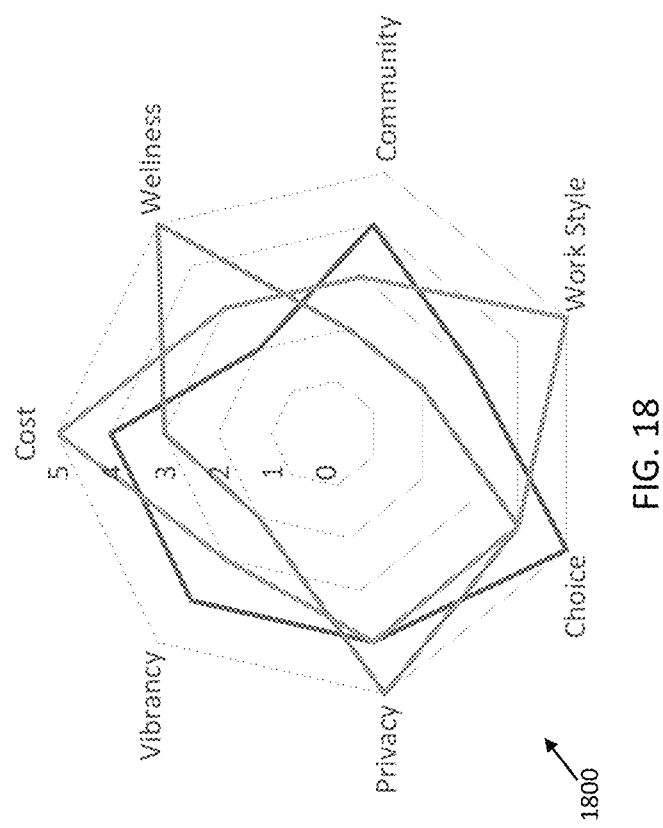
FIG. 18 shows a comparison of seven exemplary criteria scores for an exemplary set of optimized office design prototypes as illustrated in FIGS. 15-17 according to aspects of the disclosed subject matter.

FIGS. 15-17 illustrate radar charts of seven criteria scores of another exemplary set of optimized design prototypes 518. For example, as illustrated in FIGS. 15-17, an organization may select the following seven criteria 504: cost, wellness, community, work style, choice, privacy, and vibrancy to automatically generate data-driven optimized office floorplan prototypes 518. The seven criteria scores for each optimized design prototype 518 are shown below in Table 2:

TABLE 2

| Constraints | Design 4 (FIG. 15) | Design 5 (FIG. 16) | Design 6 (FIG. 17) |
|---|---|---|---|
| Cost | 4 | 3 | 5 |
| Wellness | 2 | 5 | 3 |
| Community | 4 | 2 | 3 |
| Work Style | 3 | 2 | 5 |
| Choice | 5 | 4 | 4 |
| Privacy | 4 | 5 | 4 |
| Vibrancy | 4 | 2 | 3 |

The criteria scores, as illustrated in FIGS. 11-13 and FIGS. 15-17 as examples, can range from zero to five, where zero represents the worst score and five represents the best score. A "target" prototype, in theory, can therefore have the highest criteria score of five for each criterion in the selected criteria 504 (e.g., five criteria in FIGS. 11-13 or seven criteria in FIGS. 15-17). In practice, there can be some trade-offs between different criteria. As discussed above, for example, there can be trade-offs between the cost and the wellness criteria. Therefore, a "target" prototype with the highest cost criterion score, depending on various instances, may not be able to achieve the highest score for the wellness criterion. Other trade-offs, depending on various instances, can also occur between the criteria as illustrated above.

In some embodiments, target prototypes can be determined based on the area within the selected criteria of the radar charts as illustrated in FIGS. 11-13 and FIGS. 15-17. In another example, target prototypes can also be determined based on the average of the criteria scores as shown in Table 1 and Table 2. Target prototypes can also be the prototypes that satisfy the organizational goals and culture with regard to the office design. A criteria scoring radar chart with a greater area for the selected criteria 504, for example, can represent a more target office design prototype than a criteria scoring radar chart with a smaller area for the same selected criteria 504. In some embodiments, target prototypes can also be determined based on an emphasis with one or more criteria (e.g., an emphasis may be given to one or more criteria that may be important to satisfy the organizational goals and culture). For example, target prototypes can be determined based on the weighted average of the criteria scores, where a higher weight may be given to one or more criteria when calculating the weighted average. In some embodiments, a user interface can be configured to receive inputs related to the emphasis that may be given to one or more criteria. For example, a user interface can receive inputs regarding the weight that may be given to each criteria score for calculating the weighted average of the criteria scores (e.g., as shown in Table 1 and Table 2). For example, the weight given to each criteria score can be anywhere from zero to one (e.g., 0 to 100%), and the sum of the weights given to the criteria scores may add up to one (e.g., 100%).

In these examples (e.g., as illustrated in FIGS. 11-13 and FIGS. 15-17), the design analyzer 508 can be configured to perform the comparison process 514 between an example set of office design prototypes 510 and the target prototypes with the highest criteria score of five for each criterion. The comparison process 514 can compare each criterion score in each office design prototype 510 against the target prototypes. After the comparison process 514 ended, the design system 500 can generate the final set of exemplary optimized design prototypes 518. For example, the final set of exemplary optimized design prototypes can correspond to the designs that correspond to radar charts with the highest area.

FIG. 11 shows five exemplary criteria scores for an exemplary optimized office design prototype according to aspects of the disclosed subject matter. The highest criterion score for the optimized office design prototype 1 is the choice criterion, and the score is five.

FIG. 12 shows five exemplary criteria scores for an exemplary optimized office design prototype according to aspects of the disclosed subject matter. The highest criterion score for the optimized office design prototype 2 is the wellness criterion, and the score is also five.

FIG. 13 shows five exemplary criteria scores for an exemplary optimized office design prototype according to aspects of the disclosed subject matter. The highest criterion score for the optimized office design prototype 3 is the work style criterion, and the score is also five.

FIG. 14 shows an exemplary comparison of criteria scores for an exemplary set of optimized office design prototypes according to aspects of the disclosed subject matter. FIG. 14 illustrates a comparison of the five criteria scores for the optimized design prototypes 518 and visualizes the trade-offs with respect to satisfying the five different criteria for each design. For example, architects or any interested party can analyze the comparison chart in FIG. 14 and select an optimized office floor plan that meets the organizational goals and culture. In some embodiments, a user interface can display a comparison of criteria scores (e.g., in a chart form as illustrated in FIG. 14, a comparison of averages of the criteria scores in Table 1, a comparison of weighted averages of the criteria scores in Table 1, etc.) to a user and allow the user to select an optimized office floor plan.

FIG. 15 shows seven exemplary criteria scores for an exemplary optimized office design prototype according to aspects of the disclosed subject matter. The highest criterion score for the optimized office design prototype 4 is the choice criterion, and the score is five.

FIG. 16 shows seven exemplary criteria scores for an exemplary optimized office design prototype according to aspects of the disclosed subject matter. The highest criterion scores for the optimized office design prototype 5 are the wellness criterion and privacy criterion, where both scores are also five.

FIG. 17 shows seven exemplary criteria scores for an exemplary optimized office design prototype according to aspects of the disclosed subject matter. The highest criterion score for the optimized office design prototype 6 are the work style criterion and cost criterion, where both scores are also five.

FIG. 18 shows an exemplary comparison of criteria scores for an exemplary set of optimized office design prototypes according to aspects of the disclosed subject matter. FIG. 18 illustrates a comparison of seven criteria scores for the optimized design prototypes 518 and visualizes the trade-offs with respect to satisfying the seven criteria for each design. For example, architects or any interested party can analyze the comparison chart in FIG. 18 and select an optimized office floor plan that meets the organizational goals and culture. In some embodiments, a user interface can display a comparison of criteria scores (e.g., in a chart form as illustrated in FIG. 18, a comparison of averages of the criteria scores in Table 2, a comparison of weighted averages of the criteria scores in Table 2, etc.) to a user and allow the user to select an optimized office floor plan.

In some embodiments, the organization can assess its target culture and/or goals to select any combinations of different criteria 504 (e.g., five criteria as illustrated in FIGS. 11-13 or seven criteria as illustrated in FIGS. 15-17) for automatically generating data-driven optimized office floorplan prototypes 518. In some embodiments, once different optimized office design prototypes 518 based on criteria 504 have been generated, the organization can further assess its target culture and/or goals to select one most target optimized office design prototype out of several data-driven automatically generated optimized office design prototypes 518. For example, an organization may prefer an office design that emphasizes the employee's work style. In such case, for example, the office design represented by the radar chart in FIG. 13 or FIG. 17 with the highest work style criterion score of five can be selected. In another example, a higher weight may be given to the work style score when computing the weighted average of the criteria scores.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for generating an architectural design, the system comprising:
a display device;
a memory; and
a processor coupled to the memory programmed with executable instructions, the instructions including
a modeling engine that obtains a target network model, wherein the modeling engine is configured to
receive, from a digital communications network of an organization, metadata of digital communications between members of the organization, where the received metadata is in a predetermined digital format, and
generate, based on the metadata, the target network model for one or more architectural designs the architectural design, wherein the target network model comprises
(a) a work style of the members of the organization generated by partitioning the members of the organization into different clusters based on the metadata,
(b) a level of interaction between the members of the organization generated based on a frequency of the digital communications between the members as indicated by the metadata,
(c) one or more members of the organization with a predetermined pattern of communications with other members of the organization based on the metadata, and
(d) a spatial clustering of the members of the organization based on the level of interaction between the members of the organization; and
a design generator that generates one or more architectural design prototypes, wherein the design generator is configured to
receive, via a user interface, a floorplan as an input,
partition the floorplan into one or more cells,
generate the one or more architectural design prototypes by determining a layout for the one or more cells, and associating an object with the one or more cells,
assign a use for the layout,
iteratively modify the use in the one or more architectural design prototypes until criteria scores converge within a first predetermined threshold,
iteratively modify the layout in the one or more architectural design prototypes until the criteria scores converge within a second predetermined threshold, and
iteratively modify the one or more cells in the one or more architectural design prototypes until the criteria scores converge within a third predetermined threshold; and
a design analyzer that selects one or more architectural designs, wherein the design analyzer is configured to
select at least one criterion for the one or more architectural design prototypes, the at least one criterion comprising at least one of a cost criterion, a wellness criterion, a community criterion, a work style criterion, a choice criterion, a privacy criterion, or a vibrancy criterion,
determine the criteria scores, based on the at least one criterion, for the one or more architectural design prototypes by correlating the use, the layout, and the one or more cells in the one or more architectural design prototypes to the target network model, and by performing a simulation, a heuristic model calculation, or an agent-based simulation, and
automatically select the one or more architectural designs from the one or more architectural design prototypes based on the criteria scores for the one or more architectural design prototypes; and
the user interface configured to display, on the display device
the one or more architectural designs, and
at least one of
the target network model,
the at least one criterion, or
the criteria scores.

2. The system of claim 1, further comprising a digital communications monitor configured to:
monitor the digital communications network of the organization,
collect the metadata of the digital communications between the members of the organization, where the metadata is collected in the predetermined digital format by extracting, transforming, and loading the metadata of the digital communications between the members of the organization, the collected metadata of digital communications between the members of the organization comprising metadata of at least one of emails, calendars, file sharing, or instant messages; and send the collected metadata of the digital communications between the members of the organization to the modeling engine.

3. The system of claim 1, wherein the one or more members of the organization with the predetermined pattern of communications with the other members of the organization based on the metadata comprises at least one of:
 a member of the organization who communicates with at least a first threshold number of the members of the organization, or
 a member of one department of the organization who communicates with at least a second threshold number of members in another department of the organization.

4. The system of claim 1, wherein the target network model further indicates at least one of:
 the spatial clustering of the members of the organization into zones based on the level of interaction between the members of the organization; or
 a number, a size, and an allocation of rooms with a specialized purpose for at least one of the zones based on the metadata of the digital communications indicating a number of meetings, a number of attendants for the meetings, and a duration of the meetings.

5. The system of claim 4, wherein the rooms with the specialized purpose comprises a conference room, a meeting room, a board room, or a phone booth.

6. The system of claim 1, wherein the user interface is further configured to:
 receive a selection by a user of the at least one criterion
 display the one or more architectural designs and the criteria scores for the one or more architectural designs on the display device; and
 receive a selection by the user of an architectural design from the one or more architectural designs.

7. The system of claim 1, wherein the design analyzer is configured to determine the criteria scores for the one or more architectural design prototypes by performing the simulation to:
 simulate sunlight exposure to the one or more architectural design prototypes to score the wellness criterion based on an amount of sunlight exposure time to the members of the organization in the one or more architectural design prototypes;
 simulate window access to the members of the organization in the one or more architectural design prototypes to score the wellness criterion; and
 simulate a number of visually observable members of the organization at a given area in the one or more architectural design prototypes to score the vibrancy criterion.

8. The system of claim 1, wherein the design analyzer is configured to automatically select the one or more architectural designs from the one or more architectural design prototypes based on at least one of:
 one or more of the criteria scores for the one or more architectural design prototypes with a highest score value; or
 a sum of the criteria scores for the one or more architectural design prototypes.

9. The system of claim 1, wherein the design analyzer is configured to:
 automatically discard the one or more architectural design prototypes when the criteria scores for the one or more architectural design prototypes are below a predetermined threshold;

wherein, the predetermined threshold is based on:
 one or more of the criteria scores for the one or more architectural design prototypes with a highest score value; or
 a sum of the criteria scores for the one or more architectural design prototypes.

10. The system of claim 1, wherein the design generator is configured to:
 iteratively modify the use for the layout without modifying the layout and the one or more cells in the one or more architectural design prototypes until the criteria scores converge within the first predetermined threshold;
 iteratively modify the use for the layout and the layout without modifying the one or more cells in the one or more architectural design prototypes until the criteria scores converge within the second predetermined threshold; and
 iteratively modify the use for the layout, the layout, and the one or more cells in the one or more architectural design prototypes until the criteria scores converge within the third predetermined threshold.

11. The system of claim 1, wherein the design analyzer is configured to determine the criteria scores for the one or more architectural design prototypes by performing the heuristic model calculation to:
 calculate an overall area and the layout of the one or more architectural design prototypes to score the cost criterion;
 calculate a $CO_2$ level at a given area in the one or more architectural design prototypes to score the wellness criterion or the vibrancy criterion based on a number of people calculated in the given area;
 calculate a noise level at the given area in the one or more architectural design prototypes to score the wellness criterion or the vibrancy criterion based on the number of people calculated in the given area;
 calculate an alternative seating or an alternative space in the one or more architectural design prototypes to score the choice criterion; and
 calculate a secluded place in the one or more architectural design prototypes to score the privacy criterion.

12. The system of claim 1, wherein the design analyzer is configured to determine the criteria scores for the one or more architectural design prototypes by performing the agent-based simulation to:
 simulate a sequence of actions by the members of the organization in the one or more architectural design prototypes to score the collaboration criterion or the vibrancy criterion by assigning to each of the members, a set of simulated rules for interacting with each other in the one or more architectural design prototypes, wherein the set of simulated rules are determined based on the digital communications network of an organization.

13. A method for generating an architectural design, comprising:
 receiving, from a digital communications network of an organization, metadata of digital communications between members of the organization, where the received metadata is in a predetermined digital format;
 generating a target network model based on the received metadata of digital communications between the members of the organization, the target network model comprises
 (a) a work style of the members of the organization generated by partitioning the members of the organization into different clusters based on the metadata, (b) a level of interaction between the members of the organization generated based on a frequency of the digital communications between the members as indicated by the metadata, (c) one or more members of the organization with a predetermined pattern of communications with other members of the organization based on the metadata, and (d) a spatial clustering of the members of the organization based on the level of interaction between the members of the organization;

receiving a floorplan;

partitioning the floorplan into one or more cells;

generating one or more architectural design prototypes by determining a layout for the one or more cells, and associating an object with the one or more cells;

assigning a use for the layout;

iteratively modifying the use in the one or more architectural design prototypes until criteria scores converge within a first predetermined threshold;

iteratively modifying the layout in the one or more architectural design prototypes until the criteria scores converge within a second predetermined threshold;

iteratively modifying the one or more cells in the one or more architectural design prototypes until the criteria scores converge within a third predetermined threshold;

selecting at least one criterion for the one or more architectural design prototypes, the at least one criterion comprising at least one of a cost criterion, a wellness criterion, a community criterion, a work style criterion, a choice criterion, a privacy criterion, or a vibrancy criterion;

determining the criteria scores, based on the at least one criterion, for the one or more architectural design prototypes by correlating the use, the layout, and the one or more cells in the one or more architectural design prototypes to the target network model, and by performing a simulation, a heuristic model calculation, or an agent-based simulation;

automatically selecting one or more architectural designs from the one or more architectural design prototypes based on the criteria scores for the one or more architectural design prototypes; and displaying, on a display device
the one or more architectural designs, and
at least one of
the target network model,
the at least one criterion, or
the criteria scores.

14. The method of claim 13, further comprising:
monitoring the digital communications network of the organization;
collecting the metadata of the digital communications between the members of the organization, where the metadata is collected in the predetermined digital format by extracting, transforming, and loading the metadata of the digital communications between the members of the organization, the collected metadata of digital communications between the members of the organization comprising metadata of at least one of emails, calendars, file sharing, or instant messages; and
sending the collected metadata of the digital communications between the members of the organization to the user interface.

15. The method of claim 13, wherein the one or more members of the organization with the predetermined pattern of communications with the other members of the organization based on the metadata comprises at least one of:
a member of the organization who communicates with at least a first threshold number of the members of the organization; or
a member of one department of the organization who communicates with at least a second threshold number of members in another department of the organization.

16. The method of claim 13, wherein the target network model further indicates at least one of:
the spatial clustering of the members of the organization into zones based on the level of interaction between the members of the organization; or
a number, a size, and an allocation of rooms with a specialized purpose for at least one of the zones.

17. The method of claim 16, wherein the rooms with the specialized purpose comprises a conference room, a meeting room, a board room, or a phone booth.

18. The method of claim 13, further comprising:
selecting, by a user, the at least one criterion;
displaying, to the user, the one or more architectural designs and the criteria scores for the one or more architectural designs; and
selecting, by the user, an architectural design from the one or more architectural designs.

19. The method of claim 13, wherein the criteria scores for the one or more architectural design prototypes are determined by performing the simulation comprising:
simulating sunlight exposure to the one or more architectural design prototypes to score the wellness criterion based on an amount of sunlight exposure time to the members of the organization in the one or more architectural design prototypes;
simulating window access to the members of the organization in the one or more architectural design prototypes to score the wellness criterion; and
simulating a number of visually observable members of the organization at a given area in the one or more architectural design prototypes to score the vibrancy criterion.

20. The method of claim 13, wherein the one or more architectural designs are automatically selected from the one or more architectural design prototypes based on at least one of:
one or more of the criteria scores for the one or more architectural design prototypes with a highest score value; or
a sum of the criteria scores for the one or more architectural design prototypes.

21. The method of claim 13, further comprising:
automatically discarding the one or more architectural design prototypes when the criteria scores for the one or more architectural design prototypes are below a predetermined threshold;
wherein, the predetermined threshold is based on:
one or more of the criteria scores for the one or more architectural design prototypes with a highest score value; or
a sum of the criteria scores for the one or more architectural design prototypes.

22. The method of claim 13, further comprising:
iteratively modifying the use for the layout without modifying the layout and the one or more cells in the one or more architectural design prototypes until the criteria scores converge within the first predetermined threshold;

iteratively modifying the use for the layout and the layout without modifying the one or more cells in the one or more architectural design prototypes until the criteria scores converge within the second predetermined threshold; and iteratively modifying the use for the layout, the layout, and the one or more cells in the one or more architectural design prototypes until the criteria scores converge within a third predetermined threshold.

23. The method of claim 13, wherein the criteria scores for the one or more architectural design prototypes are determined by performing the heuristic model calculation comprising:

calculating an overall area and the layout of the one or more architectural design prototypes to score the cost criterion;

calculating a $CO_2$ level at a given area in the one or more architectural design prototypes to score the wellness criterion or the vibrancy criterion based on a number of people calculated in the given area;

calculating a noise level at the given area in the one or more architectural design prototypes to score the wellness criterion or the vibrancy criterion based on the number of people calculated in the given area;

calculating an alternative seating or an alternative space in the one or more architectural design prototypes to score the choice criterion; and calculating a secluded place in the one or more architectural design prototypes to score the privacy criterion.

24. The method of claim 13, wherein the criteria scores for the one or more architectural design prototypes are determined by performing the agent-based simulation comprising:

simulating a sequence of actions by the members of the organization in the one or more architectural design prototypes to score the collaboration criterion or the vibrancy criterion by assigning to each of the members, a set of simulated rules for interacting with each other in the one or more architectural design prototypes, wherein the set of simulated rules are determined based on the digital communications network of an organization.

* * * * *